(12) United States Patent
Schlegel et al.

(10) Patent No.: US 11,222,070 B2
(45) Date of Patent: Jan. 11, 2022

(54) VECTORIZED HASH TABLES

(71) Applicant: Oracle International Corporation, Redwood Shores, CA (US)

(72) Inventors: Benjamin Schlegel, Merced, CA (US); Martin Sevenich, Palo Alto, CA (US); Pit Fender, Union City, CA (US); Matthias Brantner, Sunnyvale, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/803,819

(22) Filed: Feb. 27, 2020

(65) Prior Publication Data

US 2021/0271710 A1    Sep. 2, 2021

(51) Int. Cl.
*G06F 16/00* (2019.01)
*G06F 16/901* (2019.01)
*G06F 9/38* (2018.01)

(52) U.S. Cl.
CPC ........ *G06F 16/9014* (2019.01); *G06F 9/3887* (2013.01); *G06F 16/9024* (2019.01)

(58) Field of Classification Search
CPC .................................................. G06F 16/2255
See application file for complete search history.

(56) References Cited

U.S. PATENT DOCUMENTS

| | | |
|---|---|---|
| 6,006,233 A | 12/1999 | Schultz |
| 7,580,947 B2 | 8/2009 | Kasravi |
| 8,914,601 B1 | 12/2014 | Lethin et al. |
| 8,996,492 B2 | 3/2015 | Paradies et al. |
| 9,317,548 B2 | 4/2016 | Attaluri |
| 10,019,536 B2 | 7/2018 | Hong et al. |
| 10,346,138 B1 | 7/2019 | Quillen |
| 2006/0117036 A1 | 6/2006 | Cruanes |
| 2007/0234005 A1 | 10/2007 | Erlingsson |
| 2007/0245119 A1 | 10/2007 | Hoppe |

(Continued)

OTHER PUBLICATIONS

Lu et al., "Ultra-Fast Bloom Filters Using SIMD Techniques", IEEE Transactions on Parallel and Distributed Systems, vol. 30, No. 4, Apr. 2019, pp. 953-964. (Year: 2019).*

(Continued)

*Primary Examiner* — Cheryl Lewis
(74) *Attorney, Agent, or Firm* — Hickman Becker Bingham Ledesma LLP

(57) ABSTRACT

Techniques are described herein for a vectorized hash table that uses very efficient grow and insert techniques. A single-probe hash table is grown via vectorized instructions that split each bucket, of the hash table, into a respective upper and lower bucket of the expanded hash table. Further, vacant slots are indicated using a vacant-slot-indicator value, e.g., '0', and all vacant slots follow to the right of all occupied slots in a bucket. A vectorized compare instruction determines whether a value is already in the bucket. If not, the vectorized compare instruction is also used to determine whether the bucket has a vacant slot based on whether the bucket contains the vacant-slot-indicator value. To insert the value into the bucket, vectorized instructions are used to shift the values in the bucket to the right by one slot and to insert the new value into the left-most slot.

28 Claims, 17 Drawing Sheets

(56) References Cited

U.S. PATENT DOCUMENTS

| | | | |
|---|---|---|---|
| 2007/0294506 | A1 | 12/2007 | Ross |
| 2008/0077768 | A1 | 3/2008 | Inoue |
| 2008/0263316 | A1* | 10/2008 | Ross .................. G06F 12/0897 711/216 |
| 2009/0006450 | A1 | 1/2009 | Champion |
| 2010/0036820 | A1 | 2/2010 | Stergiou |
| 2011/0047359 | A1 | 2/2011 | Eichenberger |
| 2011/0060876 | A1 | 3/2011 | Liu |
| 2011/0202744 | A1 | 8/2011 | Kulkarni et al. |
| 2012/0143877 | A1 | 6/2012 | Kumar et al. |
| 2013/0013585 | A1 | 1/2013 | Graefe |
| 2013/0046767 | A1 | 2/2013 | Lee |
| 2014/0006756 | A1 | 1/2014 | Ermolaev |
| 2014/0188893 | A1* | 7/2014 | Kobayashi .......... G06F 16/9014 707/747 |
| 2015/0039626 | A1 | 2/2015 | Sen |
| 2015/0039627 | A1 | 2/2015 | Sen et al. |
| 2015/0143179 | A1 | 5/2015 | Desai |
| 2015/0169757 | A1 | 6/2015 | Kalantzis |
| 2017/0177361 | A1 | 6/2017 | Anderson et al. |
| 2018/0121563 | A1* | 5/2018 | Ramesh ............ G06F 16/24537 |
| 2021/0271711 | A1 | 9/2021 | Schlegel |

OTHER PUBLICATIONS

Behrens et al., "Efficient SIMD Vectorization for Hashing in OpenCL", Published in Proceedings of the 21st International Conference on Extending Database Technology (EDBT), Mar. 26-28, 2018. (Year: 2018).*

Heer et al., "Software Design Patterns for Information Visualization", IEEE Transactions on Visualization and Computer Graphics, vol. 12, dated Sep. 2006, 8 pages.

Sompolski et al., Vectotization vs. Compilation in Query Execution, dated Jun. 13, 2011, ACM 8 pages.

Ross, K., :Efficient Hash Probes on Modern Processors, IBM dated 2007 (5 pages).

Martin, Rich, "A Vectorized Hash-Join", dated May 11, 1996, 17 pages.

Kanada, Yasusi, A Vectorization Technique of Hashing and its Application to Several Sorting Algorithms, dated 1990, IEEE, 5 pages.

Franchetti et al., "Generating SIMD Vectorized Permutations", dated 2008, pp. 116-131.

Fan et al., "MemC3: Compact and Concurrent MemCache with Dumer Caching and Smarter Hashing", dated Apr. 2013, 14 pages.

Yousfi, U.S. Appl. No. 16/431,294, filed Jun. 4, 2019, Office Action, dated Apr. 6, 2020.

Yousfi, U.S. Appl. No. 16/431,294, filed Jun. 4, 2019, Notice of Allowance, dated Jan. 8, 2021.

Yousfi, U.S. Appl. No. 16/431,294, filed Jun. 4, 2019, Final Office Action, dated Jul. 8, 2020.

Yousfi, U.S. Appl. No. 16/431,294, filed Jun. 4, 2019, Advisory Action, dated Sep. 24, 2020.

U.S. Appl. No. 13/956,343, filed Jul. 31, 2013, Office Action, dated Jul. 17, 2015.

U.S. Appl. No. 13/956,343, filed Jul. 31, 2013, Notice of Allowance, dated Oct. 5, 2015.

Sen, U.S. Appl. No. 13/956,350, filed Jul. 3, 2013, Office Action, dated May 6, 2016.

Sen, U.S. Appl. No. 14/990,589, filed Jan. 7, 2016, Office Action, dated May 5, 2017.

Sen, U.S. Appl. No. 14/990,589, filed Jan. 7, 2016, Notice of Allowance, dated Jul. 31, 2017.

Sen, U.S. Appl. No. 13/956,350, filed Jul. 31, 2013, Office Action, dated Sep. 9, 2016.

Sen, U.S. Appl. No. 13/956,350, filed Jul. 31, 2013, Office Action, dated Sep. 10, 2015.

Sen, U.S. Appl. No. 13/956,350, filed Jul. 31, 2013, Office Action, dated May 6, 2016.

Sen, U.S. Appl. No. 13/956,350, filed Jul. 31, 2013, Notice of Allowance, dated Jan. 17, 2017.

Tao et al., "Using MIC to Accelerate a Typical Data-Intensive Application: The Breadth-first Search", IEEE International Symposium On Parallels, Distributed PROCESSING20 May 2013, pp. 1117-1125.

Polychroniou, O., et al., "Rethinking simd vectorization for in-memory databases", 2015 ACM SIGMOD Inti Conf on Mgmnt of Data, SIGMOD '15, pp. 1493-1508, ISBN 978-1-4503-2758-9, May 27, 2015, 16pgs.

Pietrzyk, J., et al., "Fighting the Duplicates in Hashing: Conflict Detection-aware Vectorization of Linear Probing", In BTW 2019, pp. 35-53. Gesellschaft fr Informatik, Bonn, Apr. 2019, 19pgs.

Paredes et al.., "Breadth First Search Vectorization on the Intel Xeon Phi," 16 Proceedings of the ACM International Conference On Computing Frontiers, May 16, 2016, pp. 1-10.

Paredes et al., "Exploiting Parallelism and Vectorisation in Breadth-First Search for the Intel Xeon Phi," IEEE Transactions On Parallel and Distributed Systems, vol. 31, No. 1, Jan. 1, 2020, pages.

Murray, Chuck, et al., "Oracle Spatial and Graph Property Graph Developer's Guide", 18c, Feb. 2018, 362 pgs.

Katz, G. J., et al., "All-Pairs Shortest-Paths for Large Graphs on the GPU", In Graphics Hardware, 23rd ACM SIGGRAPH/ Eurographics Sympos. on Graphics Hardware (GH '08), pp. 47-55, http://dx.doi.org/10.2312/EGGH/EGGH08/047-055, 2008, 9pgs.

Han, Sung-Chui, et al., "Program generation for the all-pairs shortest path problem", 2006 Intl Conf on Parallel Architectures and Compilation Techniques (PACT), pp. 222-232, Sep. 16, 2006, 11pgs.

Han, Sung-Chul, et al., "Optimizing all-pairs shortest-path algorithm using vector instructions," https://citeseerx.ist. psu.edu/viewdoc/download?doi=10.1.1.84.6429&rep=repl&type =pdf, 2005, 5pgs.

Gray, Jim, et al., "Transaction Processing: Concepts and Techniques—Chapter 15-Access Paths," In: Transaction Processing: Concepts and Techniques, Jan. 1, 1993, pp. 829-913, 88pgs.

Chen et al., "Efficient and Simplified Parallel Graph Processing over CPU and MIC," 2014 IEEE 28th International Parallel and Distributed Processing Symposium, May 25, 2015, pp. 819-828.

Buluc, A., et al., "Solving path problems on the GPU", Parallel Comput., vol. 36, Issues 5-6, pp. 241-253, ISSN 0167-8191, https:// dx.doi.Org/10.1016/j.parco.2009.12.002, Jun. 2010, 23 pgs.

Breslow, A. D., et al., "Horton tables: Fast hash tables for in-memory data-intensive computing", 2016 USENIX Annual TechConf (USENIX ATC '16), pp. 281-294, Denver, CO, USA, Jun. 22, 2016, 15pgs.

* cited by examiner

302
INSERT A PARTICULAR VALUE INTO A VECTOR THAT COMPRISES A PLURALITY OF VALUES; WHEREIN THE PLURALITY OF VALUES IS STORED CONTIGUOUSLY AT A FIRST EXTREME OF THE VECTOR

304
DETERMINE WHETHER THERE ARE ONE OR MORE EMPTY SLOTS IN THE VECTOR

306
IN RESPONSE TO DETERMINING THAT THERE ARE ONE OR MORE EMPTY SLOTS IN THE VECTOR, PERFORMING A SINGLE SIMD INSTRUCTION TO PERFORM: BASED, AT LEAST ON A PERMUTATION MASK, SHIFT THE PLURALITY OF VALUES IN THE VECTOR TOWARD A SECOND EXTREME OF THE VECTOR, AND BASED, AT LEAST IN PART, ON A VALUE VECTOR POPULATED WITH THE PARTICULAR VALUE, INSERT THE PARTICULAR VALUE AT THE FIRST EXTREME OF THE VECTOR

FIG. 6
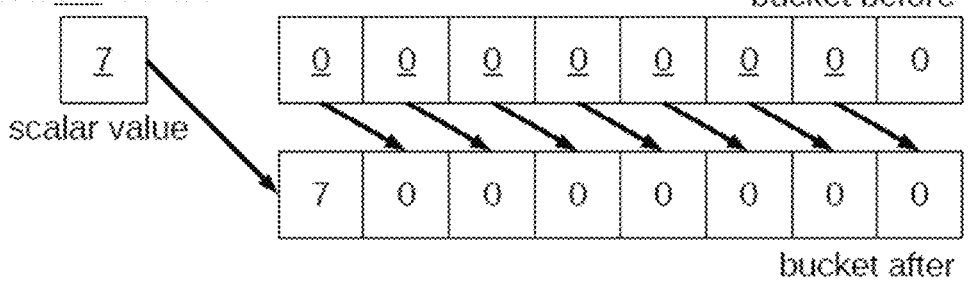
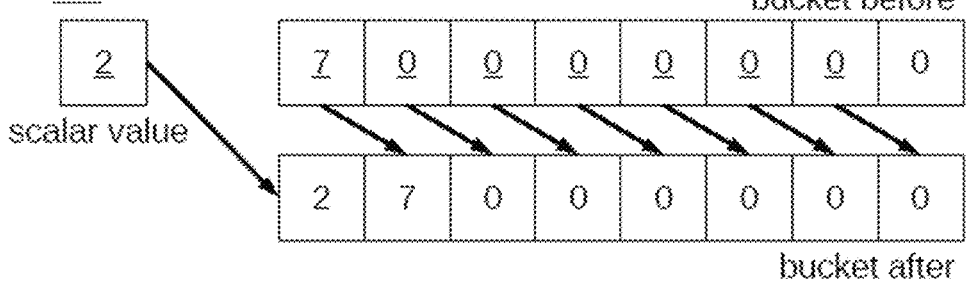
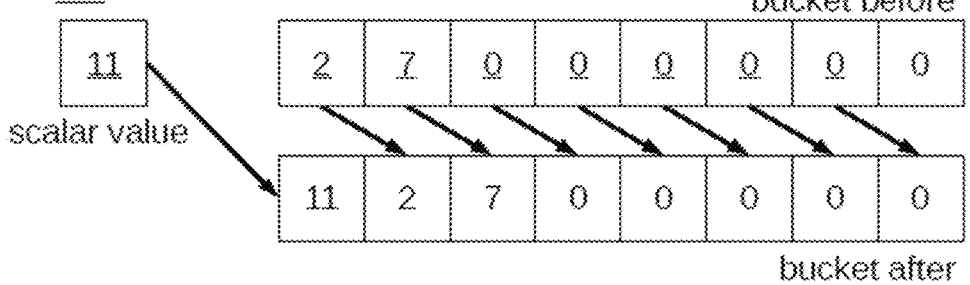
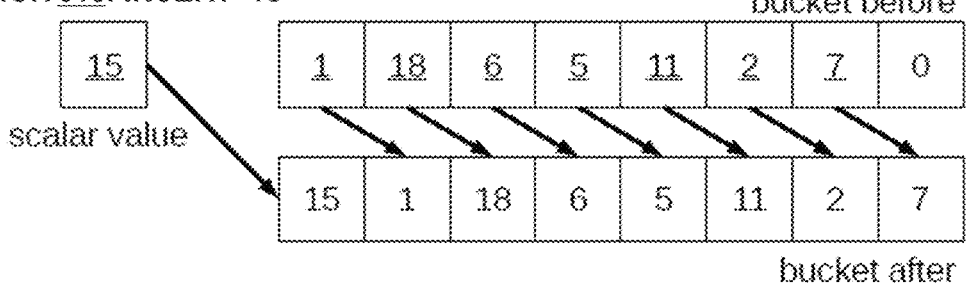

702 — EXECUTE A FIRST SIMD INSTRUCTION INSTANCE TO PRODUCE A SPLIT MASK, FOR A RESPECTIVE BUCKET, BASED ON A HASH FUNCTION FOR THE EXPANDED HASH TABLE

704 — EXECUTE A SECOND SIMD INSTRUCTION INSTANCE, BASED AT LEAST IN PART ON THE SPLIT MASK, TO IDENTIFY A FIRST SET OF VALUES OF A PLURALITY OF VALUES IN THE RESPECTIVE BUCKET

706 — POPULATE A FIRST DERIVED BUCKET, OF THE EXPANDED HASH TABLE, WITH THE FIRST SET OF VALUES

708 — EXECUTE A THIRD SIMD INSTRUCTION INSTANCE, BASED AT LEAST IN PART ON THE SPLIT MASK, TO IDENTIFY A SECOND SET OF VALUES OF THE PLURALITY OF VALUES

710 — POPULATE A SECOND DERIVED BUCKET, OF THE EXPANDED HASH TABLE, WITH THE SECOND SET OF VALUES

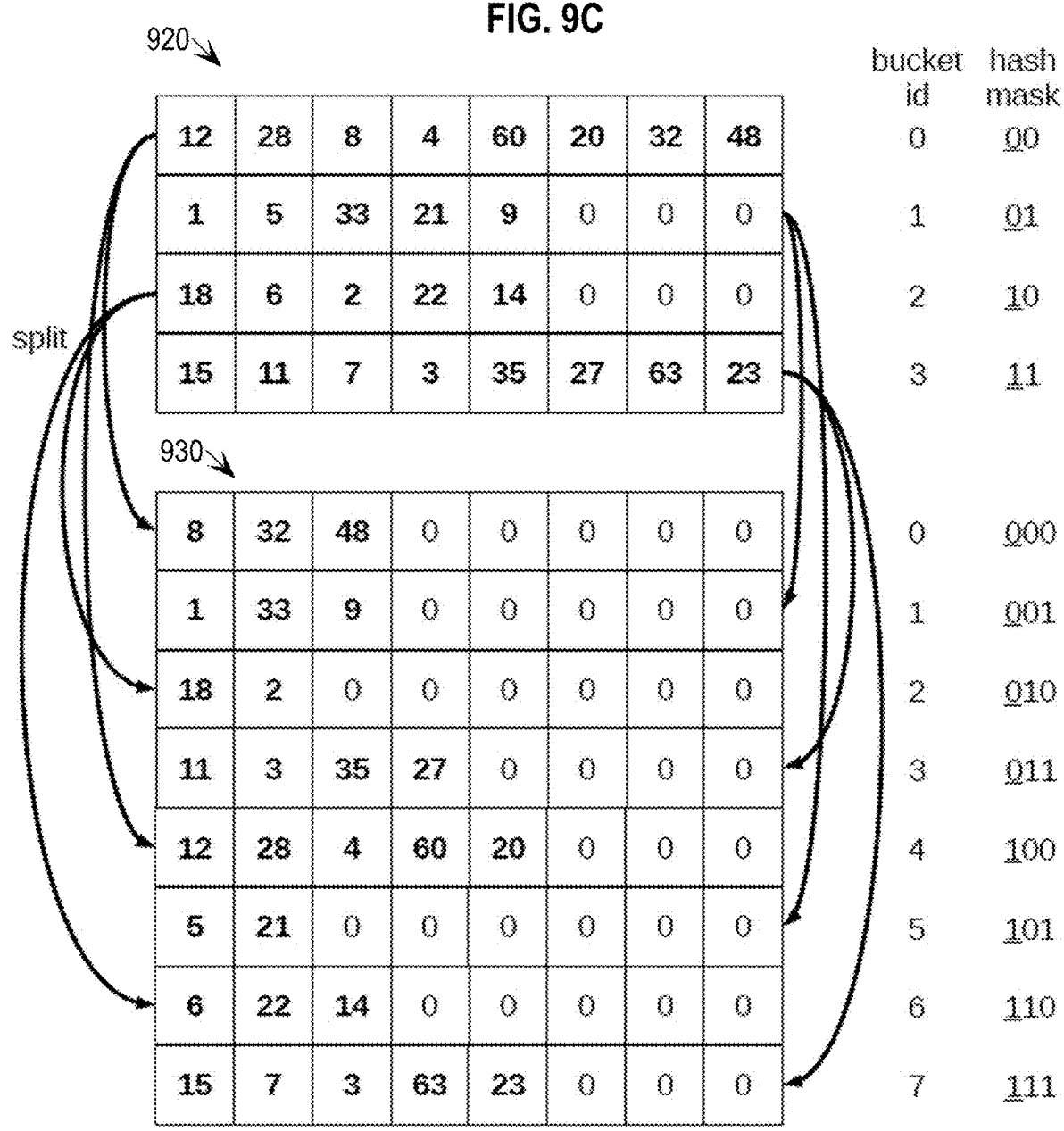

1002
PERFORM A FIRST PHASE BY IDENTIFYING, IN THE GRAPH DATABASE, ONE OR MORE NEIGHBOR NODES OF NODES IN A NEXT QUEUE

1004
PERFORM A SECOND PHASE BY DETERMINING WHETHER THE DESTINATION NODE IS INCLUDED IN THE ONE OR MORE NEIGHBOR NODES

1006
IN RESPONSE TO DETERMINING THAT THE DESTINATION NODE IS NOT INCLUDED IN THE ONE OR MORE NEIGHBOR NODES, PERFORMING A THIRD PHASE BY, FOR EACH NODE OF THE ONE OR MORE NEIGHBOR NODES: DETERMINE WHETHER THE RESPECTIVE NODE HAS PREVIOUSLY BEEN VISITED, AND IN RESPONSE TO DETERMINING THAT THE RESPECTIVE NODE HAS NOT PREVIOUSLY BEEN VISITED, INCLUDING THE RESPECTIVE NODE IN THE NEXT QUEUE

┌─ 1202
IDENTIFY A FIRST PORTION OF DATA IN A DATA SOURCE

┌─ 1204
BY A FIRST COPY OPERATION, COPY, BY VECTORS TO A DATA DESTINATION, THE FIRST PORTION OF DATA, WHERE PERFORMANCE OF THE FIRST COPY OPERATION RESULTS IN A SECOND PORTION OF DATA, LOCATED AFTER THE FIRST PORTION OF DATA IN THE DATA SOURCE, BEING COPIED TO THE DATA DESTINATION

┌─ 1206
IDENTIFY A THIRD PORTION OF DATA IN THE DATA SOURCE

┌─ 1208
BY A SECOND COPY OPERATION, COPY, BY VECTORS TO THE DATA DESTINATION, THE THIRD PORTION OF DATA, WHERE PERFORMANCE OF THE SECOND COPY OPERATION OVERWRITES THE SECOND PORTION OF DATA

FIG. 13
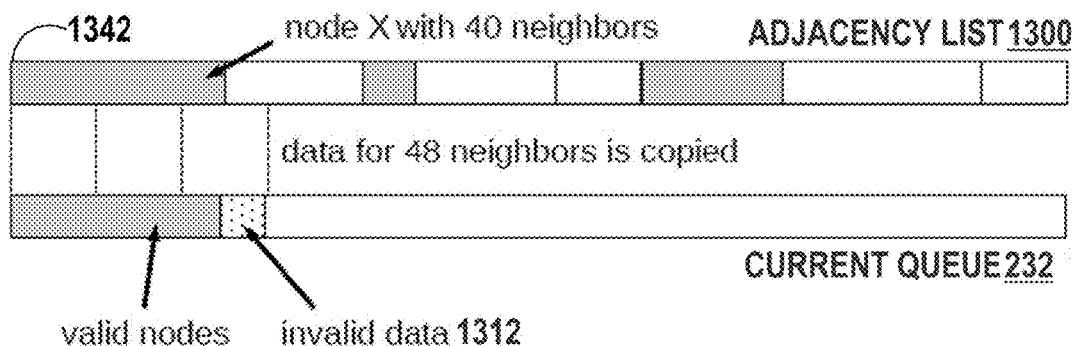
Copying the first node 1310
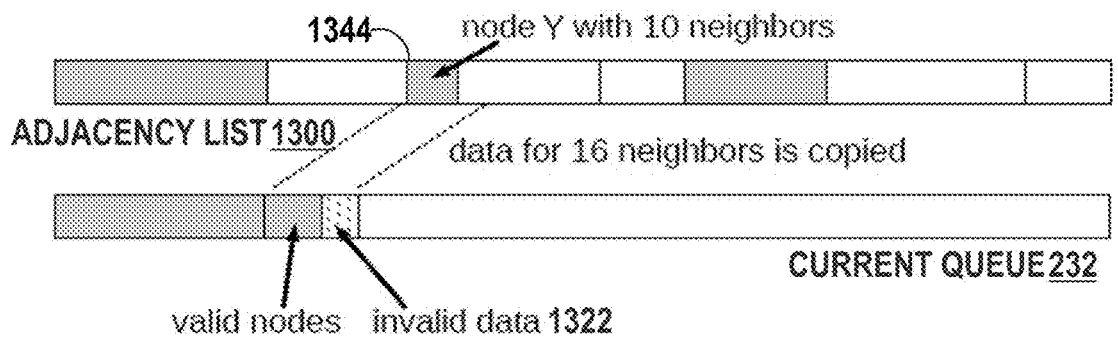
Copying the second node 1320
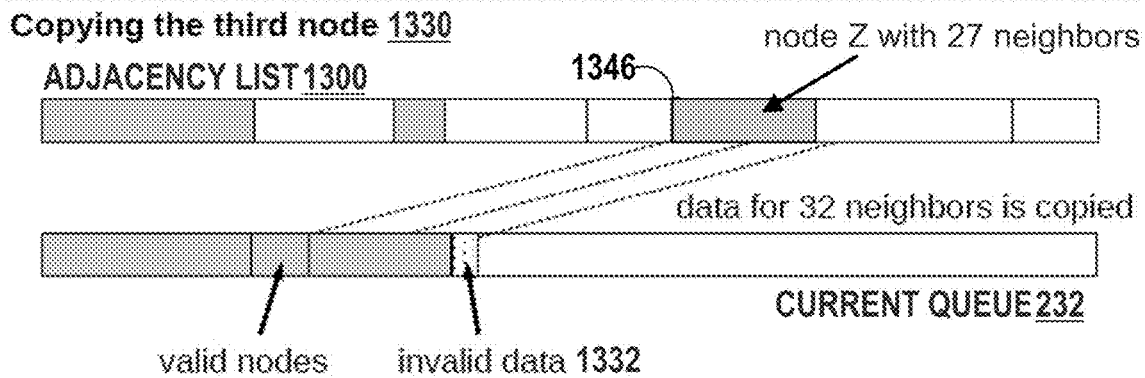
Copying the third node 1330
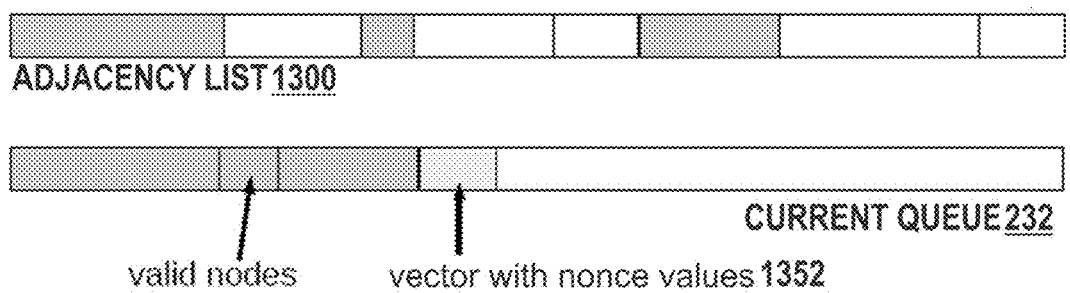
Overwriting the invalid data 1350

| Name | type | Nodes | Edges |
|---|---|---|---|
| Dataset 1 | undirected | 4,039 | 88,234 |
| Dataset 2 | directed | 77,360 | 905,468 |
| Dataset 3 | directed | 75,879 | 508,837 |
| Dataset 4 | directed | 7,115 | 103,689 |

Speedups achieved per dataset

VECTORIZED HASH TABLES

RELATED APPLICATIONS

This application is related to the following references, the entire contents of each of which are incorporated by reference as if fully set forth herein:

U.S. patent application Ser. No. 16/803,832, titled "Vectorized Queues for Shortest-Path Graph Searches", filed Feb. 27, 2020;

U.S. Pat. No. 9,779,123, titled "Building a Hash Table", filed Jan. 7, 2016, and issued Oct. 3, 2017;

U.S. Pat. No. 9,256,631, titled "Building a Hash Table Using Vectorized Instructions", filed Jul. 31, 2013, and issued Feb. 9, 2016; and U.S. Pat. No. 9,659,046, titled "Probing a Hash Table Using Vectorized Instructions", filed Jul. 31, 2013, and issued May 23, 2017.

FIELD OF THE INVENTION

The present invention relates to optimizing vector manipulation, e.g., for hash table implementation, and, more specifically, to using vectorized operations to efficiently search for and insert values into vectors.

BACKGROUND

Many algorithms rely heavily on hash tables, and, as such, the efficiency of hash table functions can greatly affect the efficiency of these algorithms. One of the most expensive operations for a hash table is growing the hash table to accommodate additional elements, which generally requires rehashing the stored elements for the expanded hash table. A common technique for avoiding costly grow operations is a multi-probe strategy, in which an element may be in H different locations within the hash table. Such a strategy provides H different opportunities for a given element to fit within the hash table before the hash table goes through the expense of growing. However, inserting an element into a multi-probe hash table can require up to H different insert operation attempts.

Vectorized approaches to hash tables generally utilize multi-probe strategies and also assume small hash table sizes, which results in issues when the hash tables scale to accommodate large datasets. For multi-probe hash tables, vectorization has been used to calculate the bucket identifiers for the H different buckets for a given key, and to search whether the key is in one of those buckets.

Also, vectorization has been used for vectorized hashing schemes, including linear hashing, double hashing, and cuckoo hashing, which exploit vectorized scatter- and gather-type instructions of AVX-512 instruction sets. However, exploitation of scatter- and gather-type instructions significantly limits performance when the hash table grows larger than the CPU cache size. Thus, the performance of such vectorized approaches are generally on par with the performance of scalar approaches when the hash tables reach 1 MB or larger, which makes these schemes unsuitable for large datasets.

Furthermore, existing approaches generally do not provide an efficient growing strategy. The lack of an efficient growing strategy is a big disadvantage since the required hash table size for many algorithms is not known in advance, and many hashing schemes—including linear hashing, double hashing, and cuckoo hashing—require expensive re-hashing when the hash table grows. As such, it would be beneficial to provide an efficient insert strategy, as well as an efficient grow operation, for hash tables that may accommodate large datasets.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 3 depicts a flowchart for inserting a value into a vector.

FIG. 6 depicts a set of vectorized operations to fill a single vector in eight steps.

FIG. 7 depicts a flowchart for increasing a cardinality of buckets of a particular hash table to produce an expanded hash table.

FIGS. 9A-C depict growing a hash table from one bucket to two buckets, from two buckets to four buckets, and from four buckets to eight buckets.

FIG. 10 depicts a flowchart for performing a three-phase shortest-path graph search.

FIG. 12 depicts a flowchart for performing vector-based data copying.

FIG. 13 depicts a set of vectorized operations to perform vector-based copying of data from an example adjacency list to a current queue.

DETAILED DESCRIPTION

Figure 1:
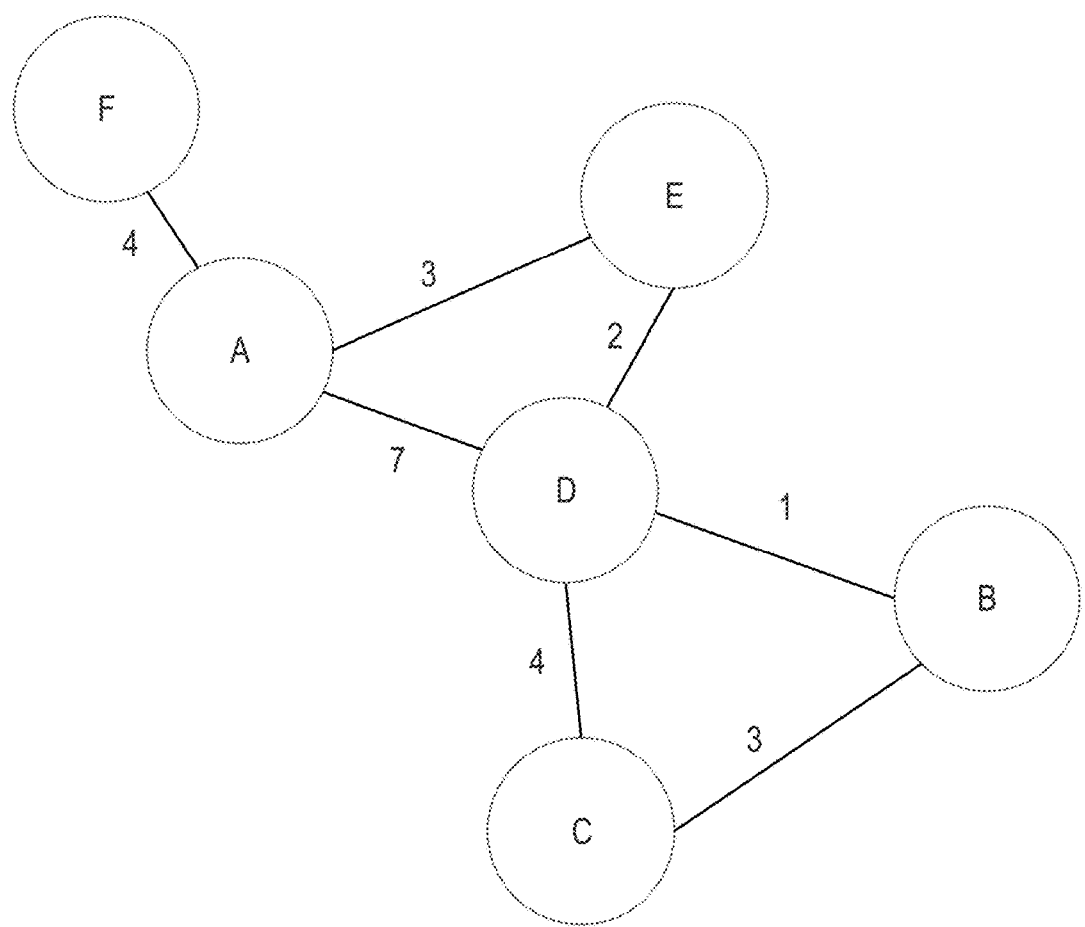
FIG. 1 depicts example graph data, with nodes and edges, maintained by a graph database management system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are described herein for a vectorized hash table, which, according to one or more embodiments, uses a very efficient vectorized grow technique and a very efficient vectorized insert technique. Vectorized operations described herein are performed using vectorized instructions, each of which performs one or more actions, on all values in a given vector (where a vector is a set of values stored in contiguous memory addresses within an address space, or stored contiguously within a register), at substantially the same time. For example, a vectorized add instruction that is applied to a particular vector adds a particular value to all values of the particular vector at substantially the same time without requiring iteration over the values of the vector.

According to an embodiment, vectorized grow techniques described herein optimize growing a single-probe hash table using vectorized instructions. Specifically, vectorized instructions are used to split each bucket, of a hash table, into a respective upper and lower bucket of the expanded hash table. A hash function, which is based on the size of the expanded hash table, maps each value of a given bucket of the original hash table to one of two buckets of the expanded hash table. Thus, rehashing of values from the original hash table to apply to the expanded hash table may be performed by very efficient vectorized instructions.

According to an embodiment these vectorized grow techniques are optimized for high instruction-level parallelism, being implemented using single loop that has no data dependencies. The bucket split operation requires constant time based on vectorized compress instructions, which allows splitting a bucket without having to loop over values in the bucket.

According to an embodiment, the vectorized hash table further employs a vectorized insert operation. Specifically, in the vectorized hash table, vacant bucket slots are indicated using a vacant-slot-indicator value, e.g., '0', and all vacant slots follow to the right of all occupied slots in a bucket. When a value is to be inserted into a particular bucket, a vectorized compare instruction is used to determine whether the value is already in the bucket. If the value is not in the bucket, the vectorized compare instruction is also used to determine whether the bucket has a vacant slot based on whether the bucket contains any instance of the vacant-slot-indicator value. Thus, according to an embodiment, to insert a value into a bucket that is known to contain a free slot, one or more vectorized instructions are used to shift the values in the bucket to the right by one slot (which shifts out a single vacant-slot-indicator value) and to insert the new value into the left-most slot. These vectorized insert operation techniques require constant time based on vectorized shuffle instructions, which allows inserting a value into a bucket without having to loop over values in the bucket, and does not require any bucket size fields.

In techniques that require dynamic hash table sizing, the vectorized hash table advantageously uses vectorized operations to efficiently insert values and grow the hash table, as needed. Improvements in efficiency are even more marked when the size of the set of elements being stored in the hash table grows large. Furthermore, the vectorized hash table has low initialization costs, uses a very efficient vectorized single-probe strategy, has a low memory footprint (e.g., no payload fields, no size field per bucket, a single pointer for all buckets—no separate pointers to individual buckets or within buckets, etc.), and is functional for arbitrary vector widths.

Database System Overview

Figure 2:
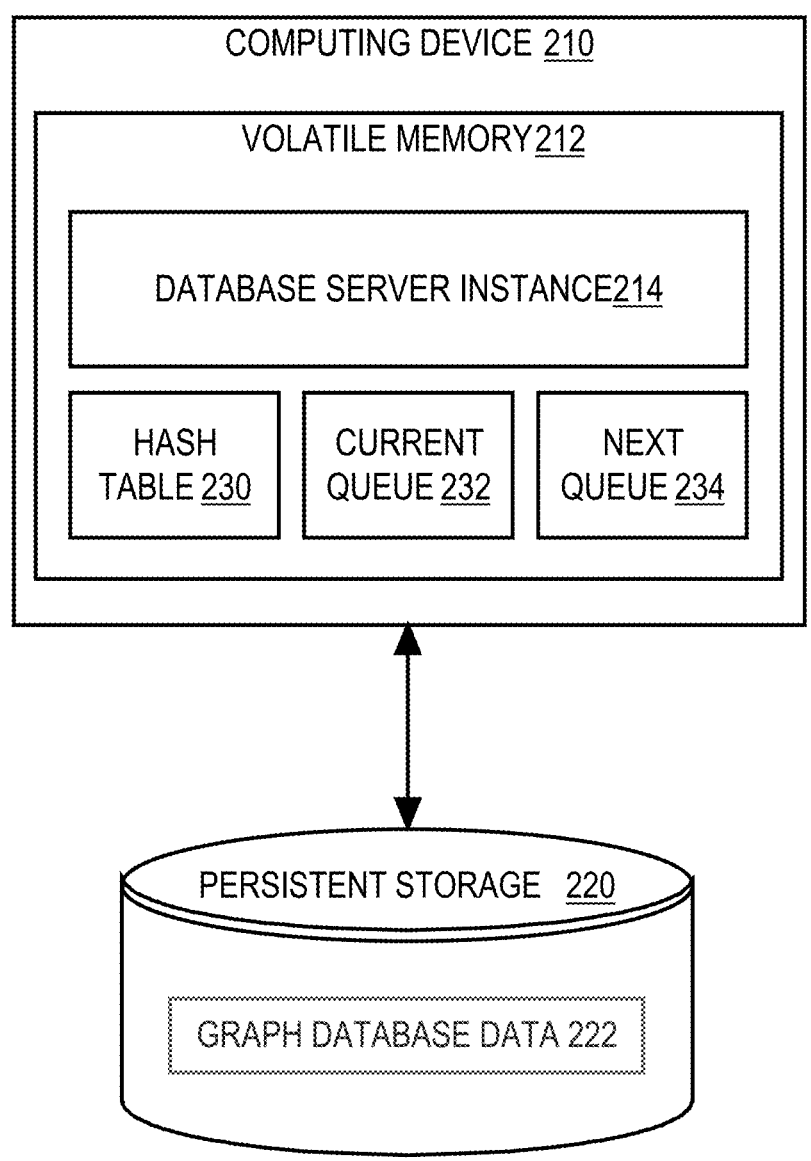
FIG. 2 is a block diagram that depicts an example arrangement for a graph database management system.

Embodiments herein are described in the context of a database system 200 of FIG. 2, comprising a single database server instance running on a single device (i.e., a single-node database system). Nevertheless, techniques described herein may be performed by any implementation of a database system, e.g., on a multi-node shared-memory database system that comprises multiple database server instances that access the same shared storage, on a multi-node shared-nothing database system that maintains database data on disks that are not shared among the multiple database server instances, on a multi-tenant database system comprising a single database server instance that serves multiple distinct databases, etc.

FIG. 2 depicts an example database system 200 comprising a database server instance 214 running in volatile memory 212 of a computing device 210. Instance 214 maintains database data 222 in persistent storage 220. Examples of graph database implementations include Parallel Graph AnalytiX (PGX). (More information regarding PGX may be found in "Oracle Spatial and Graph: Property Graph Developer's Guide", 18c, E84313-01, February 1018, the entire contents of which are hereby incorporated as if fully set forth herein.)

Embodiments herein describe operations being performed by database system 200 using AVX-512 instruction sets, which functions using sixteen 32-bit integer values per instruction, i.e., vector width K=16. However, techniques described herein for vectorized graph searches may be implemented with other vector instruction sets. For example, techniques described herein may be run for other vector-widths on AVX-512, e.g., for AVX-512VL with eight or four 32-bit integer values per instruction, or for instruction sets accommodating 32, or 64 values per instruction. Techniques described herein may also be run for instruction sets that accommodate other value widths, such as 64-bit values, 128-bit values, etc. Furthermore, techniques are described using C++-style pseudocode, but techniques may be implemented in any system that allows using vectorized instructions, as described herein.

Examples herein are described using Single Instruction, Multiple Data (SIMD)-based instructions, such as the instructions of AVX-512 instruction sets. SIMD architectures exist to allow computers with multiple processing elements to simultaneously perform the same operation on multiple data points. SIMD architectures may perform mainly "vertical" operations where corresponding elements in separate operands are operated upon in parallel and independently. Unlike vertical SIMD instructions, horizontal SIMD instructions are performed across the elements of a SIMD register. SIMD instructions allow the execution alignment of the same operation on multiple data elements at once.

Vectorized Hash Table

According to an embodiment, a vectorized hash table efficiently inserts values and grows the table, as needed, using vectorized operations. FIG. 3 depicts a flowchart 300 for inserting a value into a vector, according to an embodiment. Specifically, at step 302, a particular value is inserted into a vector that comprises a plurality of values, where the plurality of values is stored contiguously at a first extreme of the vector. For example, computing device 210 maintains a vectorized hash table with a single bucket 400 (FIG. 4A) in volatile memory 212, where each bucket of the hash table comprises a vector of values. Embodiments are described herein using integer values. However, values of vectors may represent any kind of information, according to embodiments. According to an embodiment, inserting a particular value into a vector comprises steps 304-306 of flowchart 300.

The following Pseudocode 1 illustrates a SIMDHashSet class that implements an embodiment of the vectorized hash table. In the non-limiting examples described herein, example vectorized hash tables are implemented using Pseudocode 1.

---
Pseudocode 1: SIMDHashSet
---
```
class SIMDHashSet {
private:
    // the shuffle insert mask vector
    const_m512i idx = _mm512_set_epi32(14, 13, 12, 11,
                                       10, 9, 8, 7,
                                       6, 5, 4, 3,
                                       2, 1, 0, 0);
    // the memory for the buckets
    __m512i * mem;
    // the number of buckets
    int n_buckets;
    // the mask holding the bits used for hashing
    int lsbits_mask ;
    void grow( );
public:
    SIMDHashSet ( ) {
        // allocate aligned memory for the buckets
        posix_memalign((void**)&mem, 64, sizeof(__m512i) *
            MAX_N_BUCKETS);
        // setup the initial state via clear 0
        clear( );
    }
    ~SIMDHashSet( ) {
        // free the memory used by the buckets
        free(mem);
    }
    bool insert(int val);
    void clear( );
};
```
---

The embodiment depicted in Pseudocode 1 is well-suited for many applications, including for shortest-path graph search described in further detail below. SIMDHashSet resembles the C++ unordered set container of the STL. However, embodiments may be based on other set container-type structures from other sources. Embodiments described herein support integer data types, e.g., 64-bit, 32-bit and 16-bit integer values. However, according to one or more embodiments, other data types may also be supported; values of vectors may represent any kind of information, according to embodiments.

Pseudocode 1 illustrates example member functions and variables of the class SIMDHashSet. Specifically, the class SIMDHashSet includes the following member variables:

The variable idx holds a mask used to shuffle the values in a bucket when a new value is inserted, as described in further detail herein.
The variable mem holds the memory used for the buckets.
The variable n_buckets holds the number of buckets currently used.
The variable lsbits_mask holds a mask that is used to obtain the hash value for a given value, where the hash value is used to identify the bucket for a given value.

The constructor allocates the memory used for the buckets and calls the clear function (described below) to initialize all other member variables. The allocated memory is aligned to the vector size, e.g., to 64 bytes when utilizing 512-bit vector instructions, e.g., from AVX-512. The destructor frees the allocated memory when a SIMDHashSet instance is destroyed.

The following Pseudocode 2 depicts the clear function of SIMDHashSet, which drops all values of the container, effectively reinitializing the member variables of the SIMD-HashSet instance.

---
Pseudocode 2: clear( )
---
```
void SIMDHashSet::clear( ) {
    // initialize the first bucket
    mem [0] = _mm512_setzero_si512 ( );
    // set the number of buckets to 1
    n_buckets = 1;
    // initialize the mask holding the bits used for hashing
    lsbits_mask = 0;
}
```
---

The clear function allows for reuse of an instance of the vectorized hash table for subsequent graph search operations, i.e., to avoid creating and destroying a vectorized hash table for each individual graph search.

As indicated above, the clear function reinitializes an established instance of SIMDHashSet. The initial state comprises a single bucket that has no values in it. According to an embodiment, a vacant-slot-indicator value—which is a value that is not included in the set of possible valid values (e.g., positive integers) for the vectorized hash table, such as '0'— populates vacant slots of the bucket. Marking vacant slots in this way removes the need to maintain any counter that indicates a number of values stored in a bucket. When the vacant-slot-indicator value is '0', the intrinsic function _mm512_setzero_si512 is used to fill the first bucket with '0' values via a single instruction, where an intrinsic function is a function included in an instruction set being implemented by the CPU (e.g., a CPU of device 210). Memory for future buckets is not initialized in the clear function because these buckets are initialized when the hash table grows, as described in further detail below.

Vectorized Insert Operation

According to an embodiment, the vectorized hash table supports a vectorized insert operation, which inserts a value into a bucket of the hash table if the value is not already present in the hash table. To illustrate, Pseudocode 3 below depicts an embodiment of an insert function of the class SIMDHashSet, where the insert function hashes the value to be inserted, loads the bucket corresponding to the hash result, and inserts the value into the loaded bucket when the bucket does not already contain the value.

---
Pseudocode 3: insert( )
---
```
1   bool SIMDHashSet::insert(int val) {
2       // ensure that 0 can be inserted
3       val++;
4       // replicate the value to all elements of a vector
5       __m512i val_vec = _mm512_set1_epi32(val);
6       // calculate the id of the bucket in which the value should be
7       int pos = val & lsbits_mask;
8       // load the bucket
9       __m512i bucket = _mm512_load_epi32(&mem[pos]);
10      if(!_mm512_mask2int(_mm512_cmpeq_epi32_mask(val_vec, bucket))) {
11          // value is not in the set yet
12          while(!_mm512_mask2int(_mm512_cmpeq_epi32_mask(
13              _mm512_setzero_si512( ), bucket))) {
14              // bucket is full - grow the hash table
15              grow ( );
16              // calculate new position
17              pos = val & lsbits_mask;
18              // load the bucket
19              bucket = _mm512_load_epi32(&mem[pos]);
20          }
21          // insert the value into the bucket
22          mem[pos] = _mm512_mask_permutexvar_epi32
23              (val_vec, _mm512_int2mask(0xFFFE), idx, bucket);
24          // value has been inserted -> return true
```

Pseudocode 3: insert( )

```
25        return true;
26    }
27    else {
28        // value is already in the set -> return false
29        return false;
30    }
31 }
```

Figure 4A:
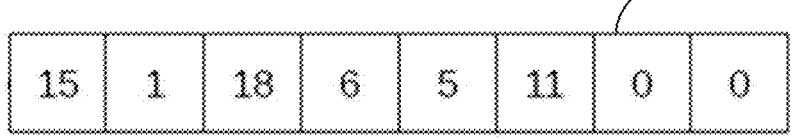
FIGS. 4A-4C depict a vector and example vectorized comparison operations performed on the vector.

FIG. 4A depicts an example hash table with a single bucket 400, which, for example, is maintained by device 210 in volatile memory 212. Depictions of vectors herein, including bucket 400, show a vector width of K=8 for simplicity of illustration, notwithstanding example pseudocode represented herein utilizing instructions that accommodate K=16 with addresses that are 64-byte aligned.

In the example of FIG. 4A, the hash table with the single bucket 400 is configured to store non-negative integers, and '0' is the vacant-slot-indicator value. In this embodiment, all valid values are incremented by one before inserting them into the hash table to allow representation of the valid value of '0', i.e., represented as '1' in the hash table, while using '0' as the vacant-slot-indicator value. Thus, only the vacant slots have the vacant-slot-indicator value of '0'. As shown in FIG. 4A, the values stored in the vector are stored contiguously to the left extreme of bucket 400, and the vacant slots stored to the right extreme of bucket 400 are populated with '0' values. While the example vectors herein illustrate compression of values to the left extreme of the vector representations, the values may be stored contiguously to the right extreme of the vector, according to embodiments.

Hashing the Value and Loading the Bucket

Returning to the discussion of step 302 of flowchart 300 (FIG. 3), device 210 determines to insert the value '6' into bucket 400. For example, the value '6' is a node identifier of a graph node that was identified in connection with the shortest-path search described in detail below. In preparation for inserting this value into bucket 400, it is incremented by one, i.e., from '6' to '7'.

Device 210 hashes the modified value, '7' to determine the bucket identifier (or $b_{id}$) associated with the value. According to an embodiment, the hash function is the remainder from division of the value to be inserted by the size of the hash table, i.e., $b_{id} = (n_{id}+1) \mod t_{size}$ where $t_{size}$ is the size of the hash table (Pseudocode 3, lines 6-7). In the example of FIG. 4A, the size of the hash table is one, and any number mod '1' equals '0'. Thus, all values being inserted into the hash table with the single bucket 400 map to bucket 400. To further illustrate, for a value of '14' to be inserted into a hash table with eight buckets, the value '14' is incremented to '15' and, because '15' mod '8'='7', the value is inserted into the seventh bucket of the hash table.

According to the embodiment depicted in Pseudocode 3, lines 6-7, the modulo operation is implemented via a bitwise-AND with the lsbits_mask to avoid a costly division instruction. The mask lsbits_mask has the n least significant bits set for a hash table of size $2^n$, e.g., it is $111_{(2)}$ for a hash table with eight buckets, and $000_{(2)}$ for a hash table with one bucket, etc. At lines 8-9 of Pseudocode 3, the bucket corresponding to the identified bucket identifier is loaded.

Determine Whether a Corresponding Bucket Contains the Value to be Inserted

Device 210 also determines whether the value to be inserted already exists in bucket 400. According to an embodiment, depicted in FIG. 4B, the value to be inserted is replicated to all elements of a vector 410 (val_vec) via the instruction _mm512_set1_epi32 (Pseudocode 3, lines 4-5).

Vector 410 is then compared with the vector stored in bucket 400. In Pseudocode 3, line 10, the comparison is performed via the instruction _mm512_cmpeq_epi32_mask, which performs an element-wise comparison of the values of both vectors and returns a bitmask. The bits of the resulting bitmask are set to 0, except for in positions where the corresponding values, of the vectors being compared, are equal, in which case the corresponding bit is set to 1. To illustrate using FIG. 4B, the vector stored in bucket 400 and the replicated value vector 410 are compared via the SIMD compare instruction, which produces result mask 420 having all bits set to '0'. Result mask 420 with all unset bits indicates that the value to be inserted is not yet in bucket 400.

In Pseudocode 3, line 10, the bitmask is converted into a scalar value 430 via _mm512_mask2int. The scalar value is used for the branch that controls whether the value is inserted into the bucket (lines 10-30). Because scalar value 430, calculated from result mask 420, is '0', it is determined that the value '7' is not in bucket 400 and needs to be inserted, which operation is described in further detail below.

Figure 4B:
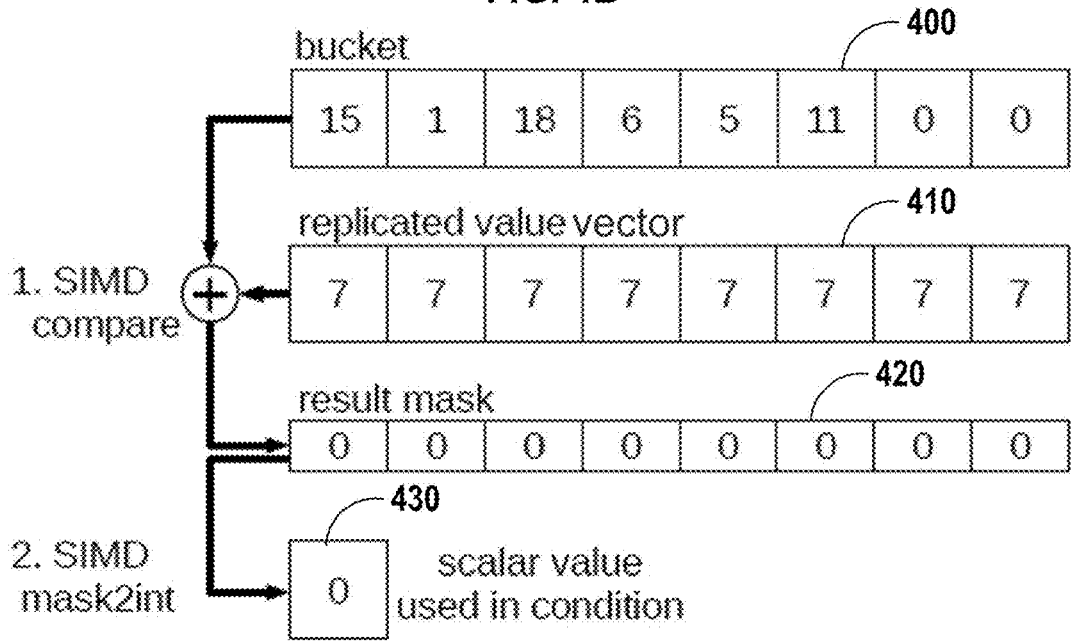
Figure 4C:
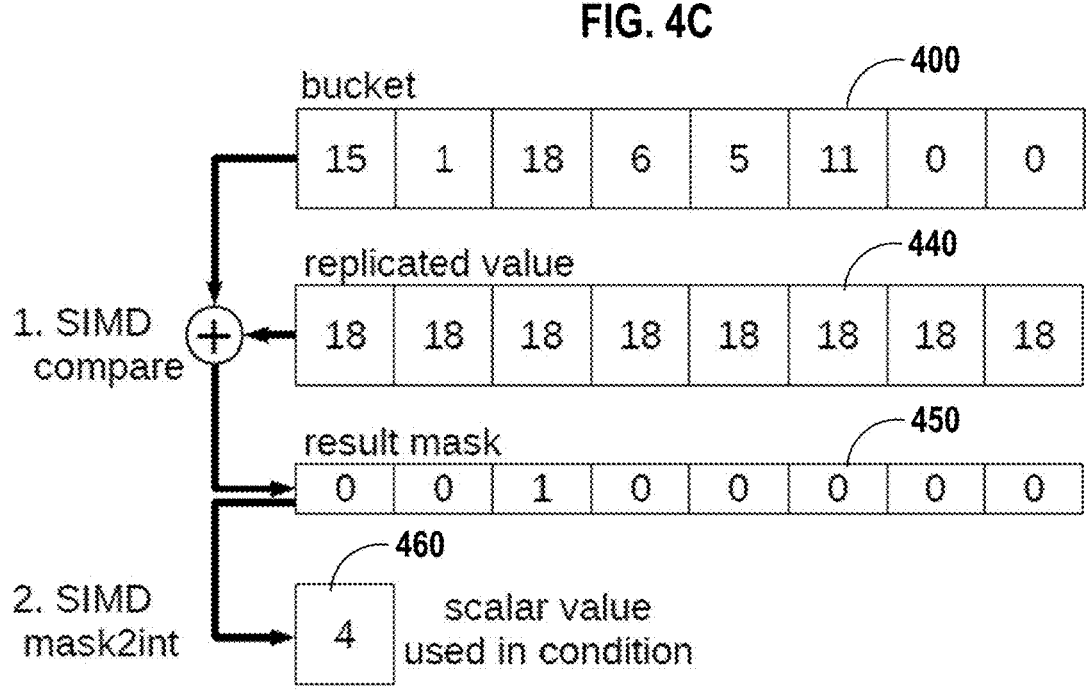

FIG. 4C further illustrates the same check as in FIG. 4B, but in connection with inserting the value '17' (incremented to '18') into bucket 400. In FIG. 4C, the two values at the third position in the vector stored in bucket 400 and in the replicated value vector 440 (storing '18') are equal. The resulting bitmask 450 is $100_{(2)}$ (omitting the leading zeros), which represents the scalar value 460 of '4'. Thus, as indicated by the non-zero scalar value 460, the value '17' is already represented in bucket 400 and does not need to be inserted. In this case, the condition at line 10 of Pseudocode 3 would evaluate to false, and the function would return FALSE.

Determine Whether a Bucket is Full

In the case where it is determined that a value to be inserted is not yet in the hash table, as shown in FIG. 4B, it is determined whether there is room in the identified bucket to insert the value. Returning to the discussion of flowchart 300 (FIG. 3), at step 304, it is determined whether there are one or more empty slots in the vector. For example, device 210 determines whether the identified bucket 400, in which value '7' should be inserted, has any empty slots by determining whether the identified bucket 400 includes any vacant-slot-indicator values, e.g., '0'.

According to an embodiment, determining whether bucket 400 includes any vacant-slot-indicator values is performed via an SIMD comparison as described above in connection with checking whether a particular value to be inserted is already in a given bucket. Specifically, given a vacant-slot-indicator value of '0', at lines 12-13 of Pseudocode 3, a vector with '0' replicated therein is created via _mm512_setzero_si512. As shown in these lines of Pseudocode 3, after a comparison of the zero-filled vector and the bucket vector via _mm512_cmpeq_epi_32_mask, the resulting bitmask is converted to a scalar value via _mm512_mask2int. The scalar value is zero when there is no empty slot in the bucket, and is larger than zero when there is at least one empty slot.

At lines 11-20 of Pseudocode 3, if there are no empty slots in the bucket identified for the value to be inserted, the hash table is grown to accommodate the value, as described in further detail below. According to an embodiment, an exponential growth strategy is used where the size of the hash table is doubled whenever it grows. As described in connection with Pseudocode 4 below, a private member grow function is called to double the size of the hash table, when needed. The grow function redistributes the values of the buckets from the original hash table using the previously described hash function.

At lines 16-17 of Pseudocode 3, after the hash table has been grown to produce an expanded hash table, the bucket identifier of the bucket that maps to the value to be inserted is recalculated. Specifically, the position of the value in the hash table might have changed because the hash function is based on the size of the expanded hash table. For example, value '7' is inserted into fourth bucket ($b_{id}$=3) for a hash table of size four while it is inserted into the eighth bucket ($b_{id}$=7) for a hash table of size eight. At lines 18-19, after calculating the updated bucket identifier, the identified bucket is loaded via _mm512_load_epi32 into the vector bucket and, returning to lines 12-13, it is checked whether the identified bucket contains a vacant slot. Specifically, the redistribution of the values in the hash table, after growing the hash table, does not guarantee that buckets that were previously full will have empty slots after the grow operation. Therefore, the hash table continues to undergo grow operations until the bucket that maps to the value to be inserted has at least one vacant slot.

Value Insertion

Once it is determined that a value should be inserted into the hash table, and the table has grown to accommodate the value (if needed), the value is inserted into the vector, stored by the bucket in the hash table that maps to the value, using vector-based instructions. Again returning to the discussion of flowchart 300, at step 306, in response to determining that there are one or more empty slots in the vector, performing a single SIMD instruction to perform: based, at least on a permutation mask, the plurality of values in the vector are shifted toward a second extreme of the vector, and based, at least in part, on a value vector populated with the particular value, the particular value is inserted at the first extreme of the vector. For example, device 210 inserts the value '7' into bucket 400 (FIG. 4A) according to lines 21-23 of Pseudocode 3. In the embodiment depicted in Pseudocode 3, a single SIMD instruction, _mm512_mask_permutexvar_epi32, is used to shift the values in the identified bucket and to insert the value into the bucket.

Figure 5:
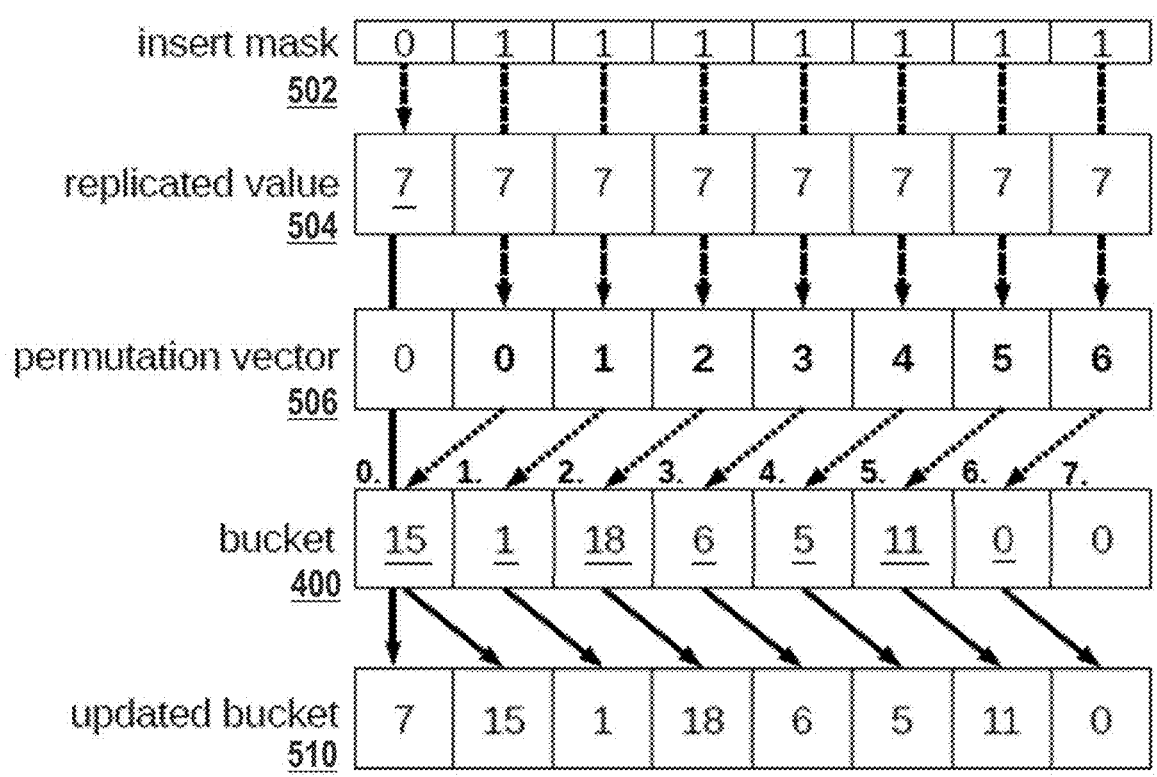
FIG. 5 depicts a set of vectorized operations to insert a value into a vector.

FIG. 5 depicts the functionality of _mm512_mask_permutexvar_epi32 to insert a value into a vector, i.e., inserting '7' into the vector of values stored in bucket 400. Using a single SIMD instruction to shift the values in the identified bucket and to insert a value into the bucket elegantly solves the problem of finding the next free slot in a bucket. Specifically, the technique (a) does not require a variable holding the size of the vector, and (b) requires a constant number of instructions that is independent from the number of values that are in the vector.

According to an embodiment, all values in the vector are stored continuously one after another (i.e., contiguously) followed by all empty slots in the vector. Thus, there are no empty slots in-between valid values in the vector. This property is ensured when inserting values in a vector, and, in the case of a hash table, when the values are redistributed while growing the hash table. Specifically, to insert a value into a vector, all values are shifted by one position in the vector, i.e., the value at the first position in the vector is moved to the second position, the value at the second position in the vector is moved the third position, and so on. Moving the values can be done via a horizontal shift instruction or a shuffle instruction, etc. Because an insert is performed after determining that the vector has at least one free slot, only vacant-slot-indicator values are shifted out of the vector and no substantive values are lost by the shift. After shifting the values, the value to be inserted is written to the first slot in the vector.

This technique for inserting values into a vector removes any need to search for a vacant slot. For example, because the vacant slots are stored contiguously to the right extreme of the vector, an empty slot for a new value may be deterministically created by shifting the values in the vector by one slot to the right. These operations are inexpensive, especially when performed using vectorized instructions.

As indicated above, Pseudocode 3 employs the intrinsic function _mm512_mask_permutexvar_epi32 to perform value insertion into a vector. The intrinsic function takes four parameters: a vector with values (val_vec), a bitmask (_mm512_int2mask (0xFFFE)), a permutation vector (idx, which is a variable of class SIMDHashSet as described above), and a second vector with values (bucket). The bitmask controls from which of the two input vectors a given value of the output vector is taken. The permutation vector controls which value of the second value vector is taken if values are selected from this vector.

FIG. 5 illustrates how a single value is inserted into bucket 400 by _mm256_mask_permutexvar_epi32, which is the 8-lane version (i.e., K=8) of _mm512_mask_permutexvar_epi32. In FIG. 5, insert mask 502 is the bitmask used to select from which of the two input vectors the values in the output vector (updated bucket 510) are taken, replicated value vector 504 is a vector holding the replicated value to be added to the bucket (val_vec in Pseudocode 3), permutation vector 506 indicates which values, from the second vector, are to be placed in the output vector at which positions, and bucket 400 represents the original vector into which the value is to be inserted.

As indicated above, bucket 400 stores the values '15', '1', '18', '6', '5', and '11' and has two empty slots before initiation of an operation to add the value '7' to the bucket. Insert mask 502 is $11111110_{(2)}$ and indicates that the first value of the output vector (i.e., the updated bucket 510) should be taken from vector 504. All other bits are set to '1' which means that the second up to the eighth value of the output vector should be "fetched" via the permutation vector from the vector holding the values of bucket 400. For example, the second value of permutation vector 506 is '0' (using 0-based counting), which means that the second value of updated bucket 510 should contain the first value of bucket 400. Similarly, the third value of the permutation vector is '1', which means that the third value of updated bucket 510 should contain the second value of bucket 400—and so on. After completion of the vectorized insert operation, updated bucket 510 holds the values '7', '15', '1', '18', '6', '5', and '11' with one empty slot remaining. Values from replicated value vector 504 and bucket 400 vector are underlined to illustrate which values make up the values of updated bucket 510.

FIG. 6 illustrates how a single bucket (with K=8) is filled in 8 steps. Specifically, a first insert operation 602 inserts the value '7' into the vector of values in the bucket. Prior to operation 602, the bucket does not contain any values. By operation 602, the zeros that mark empty spots are all shifted to the right by one to the next vector slot. As before, values that are part of the bucket after each insert operation is complete are underlined. When operation 604 to the value '2' begins, the bucket contains only the value '7', which is moved, with the zeros, to the right by one to the next vector slot. After operation 604, the bucket contains the values '2' and '7'. Similarly, the value '11' is inserted into the bucket by operation 606. Though the operations are not shown in FIG. 6, the next four values are inserted into the vector of values in a similar fashion. Operation 616 inserts the value '15' into the bucket, at which point the bucket is full. With each insert, one vacant-slot-indicator value is shifted out of the vector and a new, valid (or substantive), value is inserted at the first position of the vector.

Vectorized Grow Operation

If there are no empty slots in a bucket, of a hash table, that is mapped to a value to be inserted, the hash table is grown to accommodate the value using vectorized instructions. Vectorized grow techniques described herein iterate over each bucket of a hash table only once using vectorized instructions to handle all values in the hash table. According to an embodiment, a grow function, such as the grow function in Pseudocode 4 below, is called whenever a value should be inserted into a bucket that is already full. According to an embodiment, the hash table is grown in-place such that new buckets are added to the already-existing buckets of a hash table to produce the expanded hash table such that no additional memory is needed while moving the values for the grow operation.

Pseudocode 4: grow( )

```
1  void grow ( ) {
2    // replicate the bit test value to all elements of a vector
3    __m512i split_bit_vec = mm512 _set1_epi32(n_buckets);
4    // split the hash table
5    for(int i = 0; i < n_buckets; i++) {
6      // calculate the index of the lower bucket
7      int j = i + n_buckets;
8      // load the values of the bucket being split
9      __m512i bucket = mem[i];
10     // obtain the split mask
11     __mmask16 split_mask = _mm512_ test_epi32_mask(bucket,
12            split_bit_vec);
13     // write back the values of the lower bucket
14     mem[i] = _mm512_maskz_compress_epi32
       (_knot_mask16(split_mask),
15            bucket);
16     // write back the values of the upper bucket
17     mem[j] = _mm512_maskz_compress_epi32(split_mask,
       bucket);
18   }
19   // double the number of buckets
20   n_buckets *= 2;
21   // obtain the new mask holding the bits used for hashing
22   lsbits_mask = n_buckets – 1;
23 }
```

At lines 2-3, the grow operation depicted in Pseudocode 4 creates a vector split_bit_vec that is used to partition the values of one bucket into two buckets. At lines 5-18, Pseudocode 4 iterates over all buckets of the hash table and partitions the values of each bucket into two buckets of the new, expanded hash table. The intrinsic function _mm512_maskz_compress_epi32, used in lines 13-17, is a vectorized instruction that calculates the vector of values for a new bucket in the expanded hash table. For each bucket of the original table, two instances of this vectorized instruction are used to generate (a) the vector of values for an "upper" bucket of the expanded table and (b) the vector of values for a "lower" bucket of the expanded table, respectively. Values of the input bucket are divided amongst the lower bucket and the upper bucket based on whether the m-th bit of the respective value is set, where m=$\log_2$(n) and n denotes the number of buckets in the expanded hash table.

More specifically, _mm512_maskz_compress_epi32 takes an input vector and a bitmask as parameters, and returns a vector that includes the values from the input vector selected by the bitmask (i.e., the values in the return vector are the values in the input vector that correspond to set bits in the bit mask). The values in the return vector are stored contiguously and the remaining elements of the return vector are set to zero, an example vacant-slot-indicator value. Note that storing the values, in the resulting lower and upper buckets, contiguously at an extreme of the respective buckets facilitates vectorized insertion of values described in detail above.

At line 20 of Pseudocode 4, the value of the variable n_buckets is doubled, and at lines 21-22, a new hash mask (lsbits_mask) is calculated. Note that n_buckets holds the number of buckets in the hash table, where the binary version of this value has only the m-th bit set to one given that the number of buckets of the hash table, n, is always a power of 2.

Figure 8A:
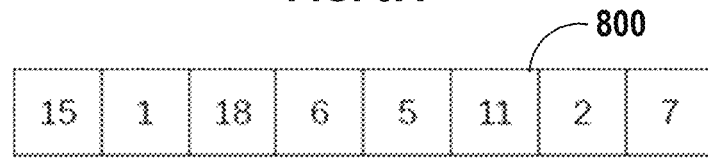
FIGS. 8A-8B depict a vector and a set of vectorized operations to split the contents of the vector into two vectors.

FIG. 7 depicts a flowchart 700 for increasing a cardinality of buckets of a particular hash table, which comprises a set of buckets, to produce an expanded hash table by, for each bucket of the set of buckets performing steps 702-710, according to an embodiment. At step 702, a first SIMD instruction instance is executed to produce a split mask, for a respective bucket, based on a hash function for the expanded hash table. To illustrate, computing device 210 maintains, in volatile memory 212, a vectorized hash table with a single full bucket 800 (FIG. 8A) that contains the values '15', '1', '18', '6', '5', '11', '2', and '7'. Device 210 attempts to insert a value into the hash table and finds that bucket 800 is full. Accordingly, device 210 grows the hash table, as illustrated in FIG. 8B, from a single bucket 800 to two buckets (upper bucket 820 and lower bucket 830).

In connection with this grow operation, device 210 calculates a split mask based on the hash function for the expanded hash table, which, according to an embodiment, is based on the size of the expanded hash table. Using the example hash function of Pseudocode 4, above, values of the input bucket 800 are divided amongst the lower bucket 822 and the upper bucket 820 based on whether the m-th bit of the respective value is set, where m=$\log_2$(n) and n denotes the number of buckets in the expanded hash table. In the case of the example hash table growing to two buckets, the values are divided based on whether the $1^{st}$ bit of the respective value is set, where 1=$\log_2$(2). In other words, values of bucket 800 that can be divided by 2 without a remainder (even values) are put in the upper bucket 820 while the other (odd) values are put in the lower bucket 822.

Figure 8B:
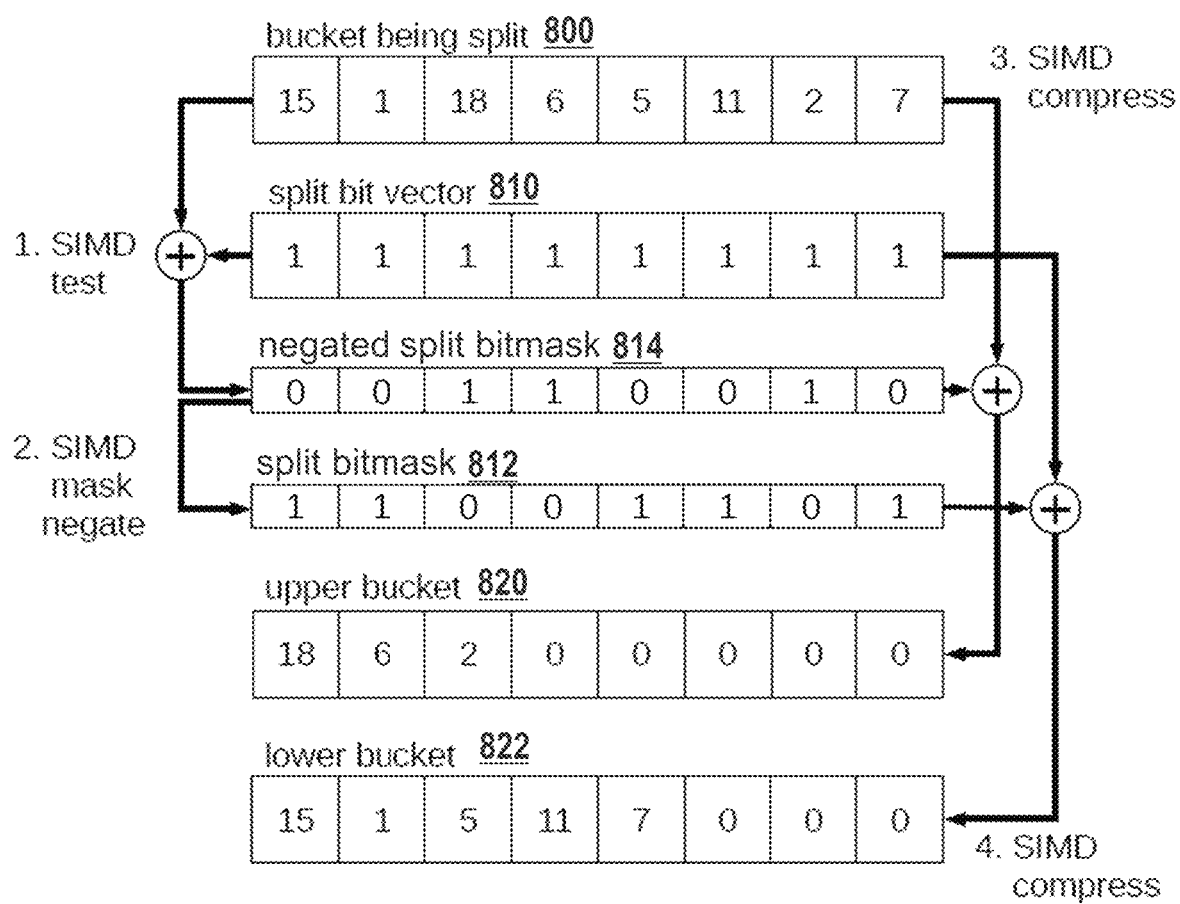

According to the example implementation depicted in FIG. 8B, split bit vector 810 is populated with the number of buckets of the hash table prior to being expanded ('1' values). A split bitmask 812 is determined based on which of the values in bucket 800 have a set bit at the same position as the corresponding value of split bit vector 810. Because the size of the hash table is either '1' or a multiple of '2', there will always be only one bit set in the hash table size values that populate split bit vector 810. Thus, using the values of bucket 800 and the split bit vector 810, the SIMD test instruction _mm512_test_epi32_mask produces split bitmask 812 (11001101$_{(2)}$), which indicates that the 3rd, 4th, and 7th value of bucket 800 have no remainder when divided by '1', and the other values of bucket 800 have a remainder when divided by '1'.

At step 704 of flowchart 700, a second SIMD instruction instance is executed, based at least in part on the split mask, to identify a first set of values of a plurality of values in the respective bucket. Further, at step 706, a first derived bucket, of the expanded hash table, is populated with the first set of values. For example, at lines 13-15 of Pseudocode 4, a first instance of the SIMD compression instruction _mm512_maskz_compress_epi32 produces a vector, using negated split bitmask 814 (which is based on split bitmask 812), that includes values from bucket 800 that correspond to set bits in negated split bitmask 814 (i.e., the even values). The instruction populates the selected values into contiguous slots to the left extreme of the vector of data in upper bucket 820 of the expanded hash table.

At step 708 of flowchart 700, a third SIMD instruction instance is executed, based at least in part on the split mask, to identify a second set of values of the plurality of values. At step 710, a second derived bucket, of the expanded hash table, is populated with the second set of values. For example, at lines 16-17 of Pseudocode 4, a second instance of the SIMD compression instruction _mm512_maskz_compress_epi32 produces a second vector, using split bitmask 812, that includes values from bucket 800 that correspond to set bits in split bitmask 812 (i.e., the odd values). The instruction populates the selected values into contiguous slots to the left extreme of the vector of data in lower bucket 822 of the expanded hash table.

The SIMD compression instruction _mm512_maskz_compress_epi32 populates empty slots of the produced vectors with vacant-slot-indicator values (e.g., '0').

Figure 9A:
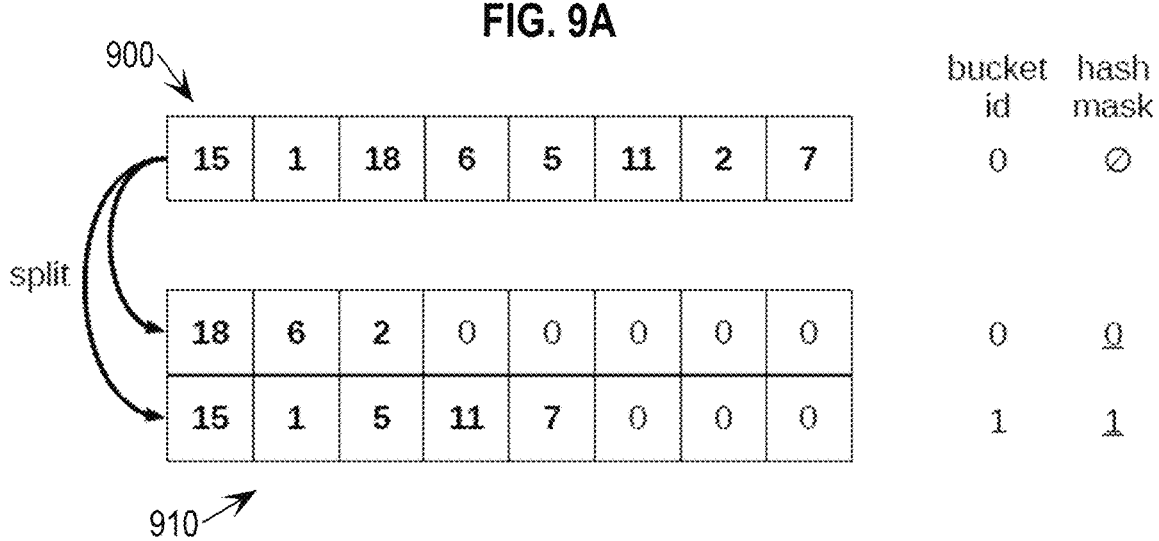
Figure 9B:
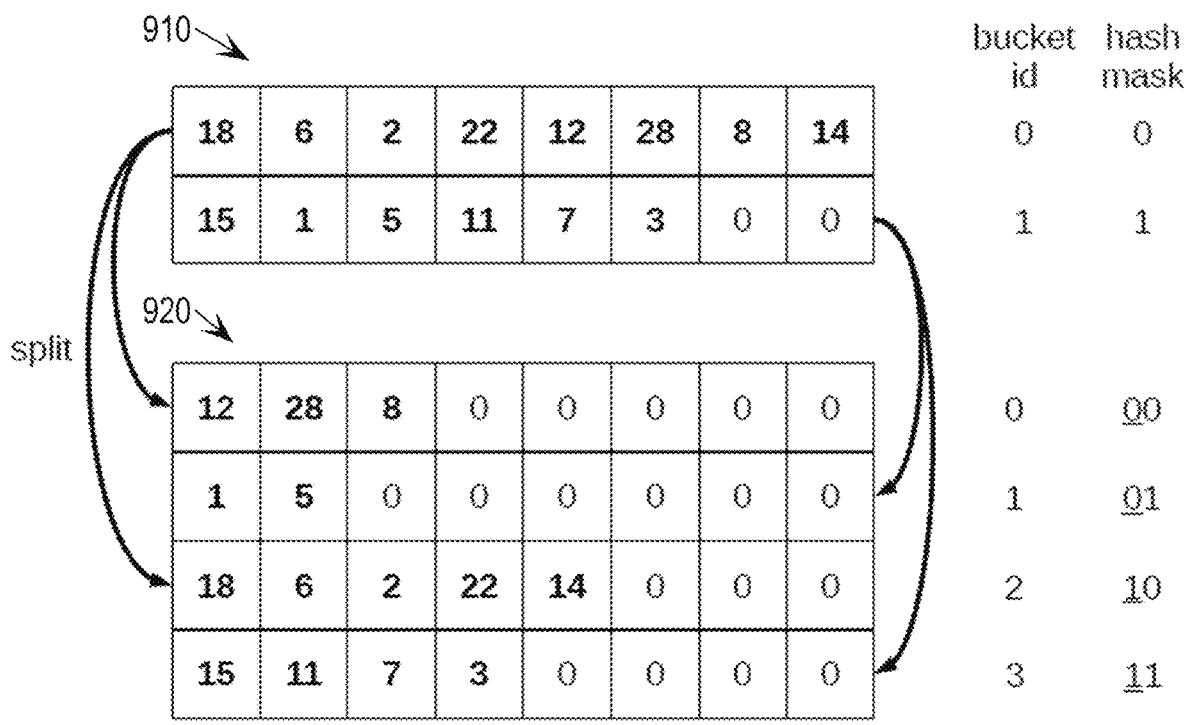

FIGS. 9A-C depict growing a hash table 900 from one bucket to two buckets (FIG. 9A), from two buckets to four buckets (FIG. 9B), and from four buckets to eight buckets (FIG. 9C). As shown in FIG. 9A, the original bucket of table 900 has the bucket identifier '0' and has no vacant slots for additional values. A grow operation is performed on table 900 to produce expanded table 910. In expanded table 910, the original bucket (now with only some of the original values) retains the bucket identifier '0', and the new bucket (with the rest of the original values of the original bucket) has the bucket identifier '1'. The values of bucket '0' from table 900 are partitioned into buckets '0' and '1' in expanded table 910 based on the respective last bits of the values, which, in effect, partitions the values based on whether they are odd or even. Thus, the values '18', '6', and '2' stay in bucket '0' while the values '15', '1', '5', '11', and '7' are moved into the bucket '1'.

FIG. 9B depicts hash table 910 that has been filled to the point where bucket '0' no longer has the capacity for an additional value. To make room for a value that currently maps to bucket '0', table 910 is expanded to table 920 with four buckets. Specifically, each of the two buckets of table 910 are split into two respective derived buckets based on the second-to-last bits of the values (i.e., based on mod 4). The values of the bucket '0' in table 910 either stay in bucket '0' in table 920 or are moved to bucket '2' in table 920, while the values of bucket '1' in table 910 either stay in bucket '1' in table 920 or are moved to bucket '3' in table 920.

After the values are partitioned, bucket '0' of table 920 contains all values with node id mod 4 (number of buckets in expanded table 920)=0, bucket '1' of table 920 contains all values with $node_{id}$ mod 4=1, and so on. After the split, bucket '0' contains the values '12', '28', and '8'; bucket '1' contains the values '1' and '5'; bucket '2' contains the values '18', '6', '2', '22', and '14'; and bucket '3' contains '15', '11', '7', and '3'.

FIG. 9C depicts hash table 920 that has been filled to the point where buckets '0' and '3' no longer have the capacity for an additional value. To add a value that currently maps to either of buckets '0' or '3', table 920 is expanded to table 930 with eight buckets. Specifically, each of the four buckets of table 920 are split into two respective buckets based on the third-to-last bits of the values (i.e., based on mod 8). Specifically, the values of the bucket '0' in table 920 either stay in bucket '0' in table 930 or are moved to bucket '4' in table 930, the values of bucket '1' in table 920 either stay in bucket '1' in table 930 or are moved to bucket '5' in table 930, and so on. After the values are partitioned, bucket '0' contains all values with $node_{id}$ mod 8 (number of buckets in table 930)=0, bucket '1' contains all values with $node_{id}$ mod 8=1, bucket '2' contains all values with $node_{id}$ mod 8=2, and so on. After the split, bucket '0' contains the values '8', '32', and '48'; bucket '1' contains the values '1', '33' and '9'; bucket '2' contains the values '18' and '2'; bucket '3' contains the values '11', '3', '35', and '27'; bucket '4' contains the values '12', '28', '4', '60', and '20'; bucket '5' contains the values '5' and '21'; bucket '6' contains the values '6', '22', and '14'; and bucket '7' contains the values '15', '7', '3', '63', and '23'.

Vectorized Queue

According to an embodiment, a vectorized queue, such as SIMDVisitorQueue defined in Pseudocode 5 below, includes features that facilitate shortest-path graph search, as described in further detail below. In the embodiment shown by SIMDVisitorQueue, the vectorized queue resembles the C++ std::queue container of the STL, however, according to embodiments, the vectorized queue may resemble another queue-type data structure from another source. While SIMDVisitorQueue supports integer data types, e.g., 64-bit, 32-bit and 16-bit integer values, other data types are supported according to embodiments.

According to an embodiment, the vectorized queue has a resize function, which removes, in constant time, all values from the queue. According to an embodiment, values are added to the vectorized queue by copying the values directly to the underlying memory array that holds the values of the queue (rather than implementing a push and pop technique).

According to an embodiment, the vectorized queue has a contains_end_node function that performs a vectorized search that checks whether a particular element (such as a destination node in a shortest-path search technique described below) is within the queue. Further, according to an embodiment, the vectorized queue has a constant time init function, which allows to reuse the queue, e.g., for multiple independent shortest-path searches.

The following Pseudocode 5 illustrates the class SIMD-VisitorQueue, which is an example implementation of the vectorized queue.

Pseudocode 5: SIMDVisitorQueue

```
1   class SIMDVisitorQueue : public vector<int> {
2   private:
3       __m512i end_node_vec ;
4
5       // returns the number of vectors in this queue
6       int n_vec( ) const {
7           int mysize = size( );
8           return mysize / K + ((mysize & (K −1)) != 0);
9       }
10  public:
11      SIMDVisitorQueue( ) {
12          // reserves space for the maximum number of nodes
13          // allowed in this queue
14          reserve(MAX_N_NODES);
15      };
16
17      // assigns the end node
18      void init(int end_ node) {
19          end_node_vec = _mm512_set1_epi32(end node);
```

| Pseudocode 5: SIMDVisitorQueue |
| --- |

```
20      }
21
22      // checks if the end node is in the queue
23      bool contains_end_node( ) {
24          __m512i* cur = (__m512i*) data( );
25          __m512i* cur_end = cur + n_vec( );
26          // iterates over all vectors of the queue until the end
27          // node is found, or all vectors have been checked
28          while (cur != cur_end) {
29              __m512i vec = _mm512_loadu_si512(cur);
30              if(_mm512_mask2int(_mm512_cmpeq_epi32_mask(vec,
31                      end_node_vec))) {
32                  // the end node has been found
33                  return true;
34              }
35              cur ++;
36          }
37          // the end node has not been found
38          return false;
39      }
40
41      // resizes the queue without initializing any values
42      void resize(int n) {
43          this->_M_impl._M_finish = this->_M_impl._M_start + n;
44      }
45  };
```

In Pseudocode 5, SIMDVisitorQueue inherits from std::vector, from which the functionality for storing values in the vectorized queue is derived. The class SIMDVisitorQueue has a constructor, one private method, and three public methods. The private method n_vec returns the number of vectors that are required to store the values in the queue; n_vec uses the underlying size method of std:vector to determine the number of values that are within the queue. The constructor of SIMDVisitorQueue initializes the underlying std::vector and reserves space for the maximum amount of values MAX_N_NODES that the queue will hold. When the vectorized queue is being used for a shortest-path search, this value of MAX_N_NODES depends on the size of the graph being subjected to the search. The resize method of SIMDVisitorQueue changes the size of the queue in constant time by modifying internal variables of the underlying std::vector. In the illustrated embodiment, this method does not initialize values (in the memory chunk that is used by the queue) when the queue grows nor overwrites values when the queue shrinks.

To facilitate a shortest-path search, the method init of SIMDVisitorQueue sets up a vector end_node_vec, which holds the destination node (or end node) in all of its slots. Note that the init function is separated from the constructor because the queue is constructed only once but is configured to be reused for multiple applications, such as multiple shortest-path searches.

Also to facilitate a shortest-path search, the contains_end_node method checks whether the queue contains the destination node, where the method iterates through all vectors of values stored in the queue, checking each vector for the destination node with vectorized instructions such that the technique does not need to iterate through the values of the vectors. Specifically, in each iteration (lines 28-36 of Pseudocode 5), contains_end_node retrieves a vector of values, vec, from the queue array and compares vec with the vector end_node_vec via the vectorized instruction _mm512_cmpeq_epi32_mask (lines 30-31), as described in detail above in connection with FIGS. 4B and 4C.

The bitmask that is returned by _mm512_cmpeq_epi32_mask contains a bit set to one if the destination node is present in the vector vec, and contains all zeros if the destination node is not present in vec. The mask is converted to a scalar value via _mm512_mask2int, which returns a scalar value larger than zero when the mask contains a bit set to one and zero otherwise. If the scalar value is larger than zero, the destination node was found in the queue, and the contains_end_node method returns TRUE (lines 32-33). Otherwise, the loop (lines 28-36) continues. If the loop finishes after comparing all vectors of values stored in the queue with the vector end_node_vec and the destination node has not been found, then the method returns FALSE (lines 37-38).

Shortest-Path Graph Search

According to an embodiment, a vectorized shortest-path graph search identifies a graph path, between a source and destination graph node, with a minimum number of hops in the path. However, techniques for shortest-path graph search described herein are also applicable to the problem of finding paths, between source and destination graph nodes, with minimal sums of edge weights. Furthermore, while techniques are described in the context of single-pair shortest-path problems, the described techniques are applicable to other variations on the shortest-path problem, including the single-source shortest-path problem, the single-destination shortest-path problem, and the all-pairs shortest-path problem.

Similar to the scalar technique (described in Pseudocode 9 below), vectorized shortest-path search techniques described herein use breath-first search strategies to find the shortest path. Specifically, these techniques iteratively expand a set of nodes that can be reached from a source node until either the destination node is found, or it is determined that the destination node is not in the set of nodes that are reachable from the source node. However, unlike the scalar technique, the search techniques described herein use the vectorized queue described herein and, according to one or more embodiments, the vectorized hash table also described herein to perform an efficient, vectorized shortest-path graph search.

As described in further detail below, the vectorized shortest-path graph search splits up each iteration of breadth-first search expansion of the set of reachable nodes, performed in connection with finding the shortest path between nodes, into three phases:

In a first phase, the neighbor nodes of nodes that are in a next queue are fetched and written into a current queue using vectorized instructions, e.g., the method fetch_neighbors of Pseudocode 7 described in further detail below.

In a second phase, it is determined whether the destination node has been found within the fetched neighbor nodes in the current queue via vectorized instructions, such as the vectorized instructions of the contains_end_node method of the vectorized queue described above. Searching for the destination node in the current queue before checking if these node have been visited (performed in a third phase) avoids unnecessary checks of whether nodes have been visited, i.e., in the last expansion iteration in which the destination node is found among the fetched neighbors.

In a third phase, the fetched neighbor nodes that have not yet been visited are put into the next queue.

FIG. 10 depicts a flowchart 1000 for identifying a path, in a graph database, between a pair of nodes that comprises a source node and a destination node, according to an embodiment. For example, device 210 receives a graph query that requires searching for a shortest path between a particular source node and a particular destination node in graph database data 222. Accordingly, instance 214 initiates a shortest-path graph search over graph database data 222.

The following Pseudocode 6 depicts an example shortest path method that implements an embodiment of the three-phase shortest-path search technique described above:

---
Pseudocode 6: shortest_path( )
---

```
1   int Graph::shortest_path(SIMDVisitorState& vs, int node0, int
        node1) {
2       // check if start node and the end node are the same nodes
3       if(node0 == node1)
4           return 0;
5       // get all data structures from the visitor state
6       SIMDHashSet* myset = vs.getHashSet( );
7       SIMDVisitorQueue *cur_queue = vs.getCurQueue( );
8       SIMDVisitorQueue *next_queue = vs.getNextQueue( );
9       // set the end node in both queues
10      cur_queue->init(node1);
11      next_queue->push_back(node0);
12      int dist = 0;
13      // run until there are no new nodes in the next queue
14      while(next_queue->size( )) {
15          dist++;
16          // fetch all neighbors using the next queue into the
17          // current queue
18          fetch_neighbors(vs);
19          // check if the current queue contains the end node
20          if(cur_queue->contains_end_node( ))
21              return dist;
22          // iterate over the current queue until all nodes are processed
23          for(auto it = cur_queue->begin( ); it != cur_queue->end( ); i
                t++) {
24              // check if the node has already been visited
25              if(myset->insert(*it)) {
26                  // if the node has not been visited , add it to
27                  // the next queue
28                  next_queue->push_back(*it);
29              }
30          }
31      }
32      // there is no path from the start node to the end node
33      return -1;
34  }
```

The shortest path method in Pseudocode 6 has three parameters: the visitor state vs holding one or more vectorized data structures, as well as a source node, node0, and destination node, node1. Similar to the sequential version (see Pseudocode 9 below), in lines 2-4 of Pseudocode 6, the shortest_path method returns '0' when the source node and the destination node are the same. At line 10, the current queue is initialized using the destination node by calling the init method, an example of which is described above. Initializing the current queue with the identifier of the destination node is needed to be able to call contains_end_node while iteratively increasing the set of reachable nodes. At line 11, the source node is added to the next queue, next queue, and, at line 12, the distance dist is set to '0' before the iterative breath-first search starts (see lines 13-31).

As mentioned earlier, the main loop at lines 13-31 works in three phases: 1) first phase: fetch the neighbor nodes of all nodes in the next queue, e.g., by calling fetch_neighbors (lines 17-18), which is described in detail below; 2) determine whether the destination node has been found among the fetched neighbor nodes by calling contains_end_node, and return if the destination node has been found (lines 19-21); 3) add, to the next queue, those nodes in the current queue that have not been previously visited (lines 22-30), e.g., via a call to push_back the node identifier to the next queue (lines 26-28). According to an embodiment, in connection with the third phase, checking whether a node has been visited is performed by calling the insert method of the vectorized hash table (lines 24-25). As described above, the insert method attempts to insert a node identifier into a vectorized hash table. The insert method returns '1' or TRUE if the node identifier was successfully inserted into the hash table, i.e., because it was not already in the hash table, and otherwise returns '0' or FALSE. At lines 32-33, if the next queue is empty after an expansion iteration, then the destination node cannot be reached from the source node and the shortest_path method returns '-1'.

Returning to the discussion of flowchart 1000, at step 1002, a first phase is performed by identifying, in the graph database, one or more neighbor nodes of nodes in a next queue. For example, device 210 identifies neighbor nodes, of nodes in a next queue, based on an adjacency list for nodes represented in graph database data 222 that is maintained by device 210. Specifically, the adjacency list for data 222 includes a respective node-specific adjacency list for each node in graph database data 222. The node identifiers in each node-specific adjacency list are stored contiguously such that, in the adjacency list, the node identifiers for neighbors of a given node are listed one after the other until all neighbor nodes are listed. Subsequently within the adjacency list data, identifiers of all neighbor nodes of a second node are listed contiguously, and so on. According to an embodiment, references to inclusion of nodes in a list or vector refers to inclusion of an identifier of the node in the list or vector.

According to an embodiment, device 210 identifies the neighbor nodes of a given node in the next queue based on mapping data that maps the node identifier of the given node to a location, in an adjacency list in data 222, that stores the node-specific adjacency list of the given node. According to an embodiment, the mapping data further indicates a length of the node-specific adjacency list.

Figure 11:
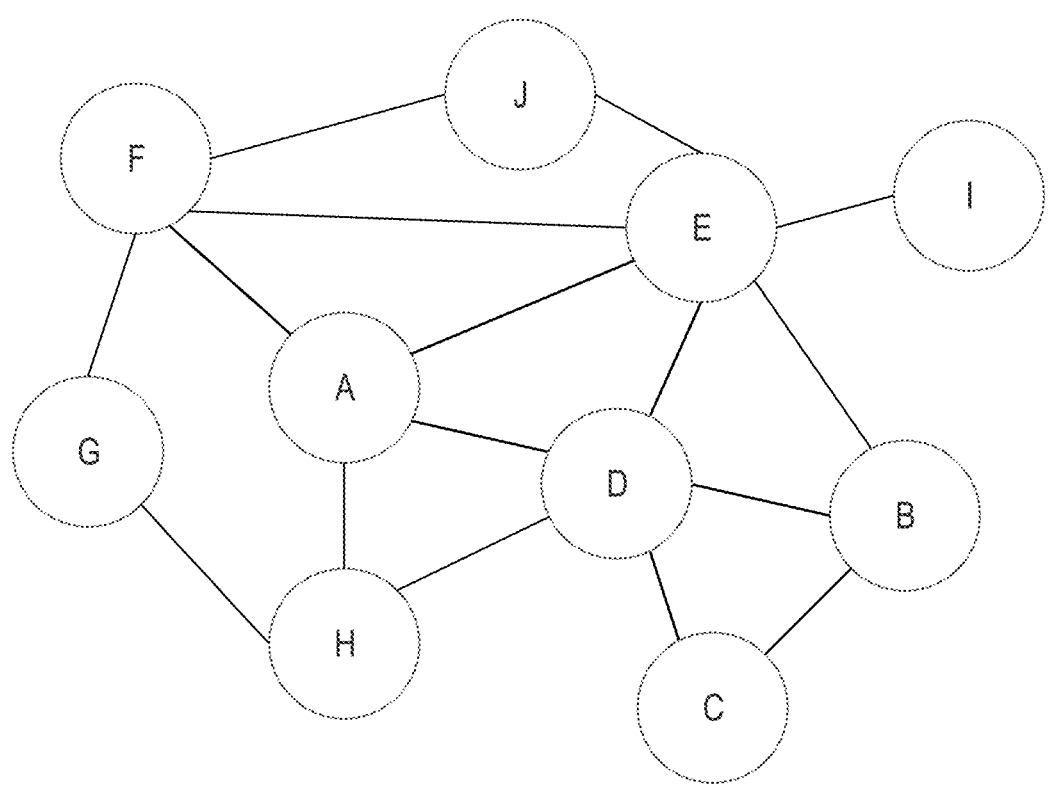
FIG. 11 depicts example graph data, with nodes and edges, maintained by a graph database management system.

To illustrate identifying neighbor nodes in connection with the first phase of a shortest-path graph search, database server instance 214 (FIG. 2) executes a received graph query that requires a shortest-path graph search between source node F and destination node B in graph database 1100 depicted in FIG. 11, maintained in graph database data 222. According to an embodiment that follows the pattern of the shortest_path method in Pseudocode 6, instance 214 initializes a current queue 232 with the destination node B and pushes the source node F to a next queue 234, where current queue 232 and next queue 234 are vectorized queues as described herein. With the source node F in next queue 234, instance 214 starts a first iteration of breadth-first node expansion by performing a first phase described in step 1002 by fetching all neighbor nodes [G, A, E, J] of node F into current queue 232.

Returning to the discussion of flowchart 1000, at step 1004, a second phase is performed by determining whether the destination node is included in the one or more neighbor nodes. For example, at the second phase of performing the current iteration of breadth-first node expansion, instance 214 determines whether the destination node B is in current queue 232 (currently holding [G, A, E, J]), e.g., using the contains_end_node method of the vectorized queue. Accordingly, instance 214 determines that the destination node B is not in current queue 232.

At step 1006, in response to determining that the destination node is not included in the one or more neighbor nodes, a third phase is performed by, for each node of the one or more neighbor nodes: determining whether the respective node has previously been visited, and in response to determining that the respective node has not previously been visited, including the respective node in the next queue. For example, upon determining that the destination node B is not in current queue 232, instance 214 adds, to next queue 234, those nodes in current queue 232 that have not been previously visited during the current shortest-path search.

According to an embodiment, instance 214 determines whether each of the nodes in current queue 232 have previously been visited by attempting to insert them into hash table 230, which is implemented as a vectorized hash table as described in detail herein. If the node being inserted into hash table 230 has not yet been visited, the insert function inserts the node identifier and returns a '1' or TRUE. If the node has already been visited, the insert function returns a '0' or FALSE. Only identifiers of nodes in current queue 232 that have not already been visited are written to next queue 234.

Continuing with the example above, all of the node identifiers for [G, A, E, J] are written to next queue 234 based on instance 214 determining that none of these nodes have previously been visited. Iterations of node expansion are continued until either a path between source node F and destination node B has been identified, or it is determined that there is no path between the nodes. To illustrate, in a first phase of a second iteration of breadth-first node expansion, instance 214 loads the neighbors of [G, A, E, J] (contents of next queue 234) into current queue 232. Specifically the neighbors of G [F, H], the neighbors of A [F, E, D, H], the neighbors of E [F, J, I, B, D, A], and the neighbors of J [F, E] are loaded into current queue 232 such that, after the first phase, current queue 232 stores nodes [F, H, F, E, D, H, F, J, I, B, D, A, F, E]. In a second phase of the second iteration of breadth-first node expansion, instance 214 determines whether destination node B is included in current queue 232. Because an identifier of B is in current queue 232, instance 214 returns the calculated distance, '2', and ends the shortest-path search. In this second iteration of breadth-first node expansion, instance 214 avoided unnecessarily probing of hash table 230 by delaying the potential probing until after completion of the second phase of the second iteration of breadth-first node expansion.

Vectorized shortest-path graph search techniques described herein are also applicable to dual breath-first shortest-path searches starting from both the start node and the destination node. Specifically, instead of one set of visited nodes, two sets of visited nodes are maintained during the search. The shortest path is found as soon as a node from one set is found in the other set.

Vector-Based Copy of Neighbor Nodes to the Current Queue

According to an embodiment, device 210 performs vector-based copying of nodes using vectorized instructions, e.g., in connection with the first phase of shortest-path search expansion. Vector-based copying of data comprises copying vectors of data directly from a source (e.g., an adjacency list) to an underlying memory array (e.g., that holds the values of the queue). FIG. 12 depicts a flowchart 1200 for performing vector-based copying of data, according to an embodiment. At step 1202, a first portion of data is identified in a data source. For example, in a first phase of an iteration of breadth-first node expansion, as described above, instance 214 loads the neighbors of nodes X, Y, and Z into current queue 232. Specifically, instance 214 identifies a node-specific adjacency list for each of nodes X, Y, and Z based on mapping data that maps the node identifier of each node to respective a location in an adjacency list for the graph data.

FIG. 13 depicts an example adjacency list 1300 that, for example, is stored as part of graph database data 222 (FIG. 2) and is loaded into volatile memory 212 in connection with execution of the shortest-path graph search above. As depicted in FIG. 13, a node-specific adjacency list for node X in adjacency list 1300 begins at location 1342 and includes 40 neighbor node identifiers. Further, a node-specific adjacency list for node Y in adjacency list 1300 begins at location 1344 and includes 10 neighbor node identifiers, and a node-specific adjacency list for node Z in adjacency list 1300 begins at location 1346 and includes 27 neighbor node identifiers.

At step 1204 of flowchart 1200, by a first copy operation, the first portion of data is copied, by vectors, to a data destination, where performance of the first copy operation results in a second portion of data, located after the first portion of data in the data source, being copied to the data destination. For example, instance 214 uses one or more vectorized instructions to copy the node-specific adjacency list for node X, at location 1342 in adjacency list 1300, into current queue 232.

FIG. 13 depicts a first example copy operation 1310 by which instance 214 copies the node-specific adjacency list for node X, by vectors of width K=16, to the memory array for current queue 232. The length of the node-specific adjacency list for node X is 40 node identifiers, which requires three vectorized load and three vectorized store operations to copy to memory for current queue 232. Because the length of the required data is not perfectly divisible by the width of the vectors being used, 48 node identifiers are copied from adjacency list 1300 to the memory array for current queue 232, where eight node identifiers (depicted as invalid data 1312), which are not part of the adjacency list for node X, are copied to current queue 232 after the end of the valid copied data.

At step 1206, a third portion of data is identified in the data source. For example, instance 214 uses the mapping data to identify a node-specific adjacency list for node Y that begins at location 1344 in adjacency list 1300, and includes 10 neighbor node identifiers.

At step 1208, by a second copy operation, the third portion of data is copied, by vectors, to the data destination, where performance of the second copy operation overwrites the second portion of data. For example, instance 214 uses one vectorized load instruction and one vectorized store instruction to copy 16 node identifiers, including the adjacency list for node Y, from location 1344 in adjacency list 1300, into the memory array for current queue 232.

FIG. 13 further depicts a second copy operation 1320 by which instance 214 copies the adjacency list for node Y, by vectors of width K=16, to the memory array for current queue 232. Instead of copying the adjacency list for node Y to the end of the previously copied data, instance 214 overwrites invalid data 1312 with the node-specific adjacency list for node Y such that no invalid data remains, after second copy operation 1320, between the two node-specific adjacency lists in current queue 232. However, because the length of the node-specific adjacency list for node Y is 10 node identifiers, which is not perfectly divisible by the width of the vectors being used, six node identifiers (depicted as invalid data 1322), which are not part of the node-specific adjacency list for node Y, are copied to the memory array for current queue 232 after the end of the valid copied data.

As also depicted in FIG. 13, at a third copy operation 1330, instance 214 uses one or more vectorized instructions to copy the node-specific adjacency list for node Z, at location 1346 in adjacency list 1300, into the memory array for current queue 232. More specifically, by third copy operation 1330, instance 214 uses two vectorized load instructions and two vectorized store instructions to copy 32 node identifiers from adjacency list 1300, including the 27 neighbor node identifiers for node Z, by vectors of width K=16, to the memory array for current queue 232. Instead of copying the adjacency list for node Z to the end of the previously copied data, instance 214 overwrites invalid data 1322 with the node-specific adjacency list for node Z such that no invalid data remains, after third copy operation 1330, between any of the adjacency lists in current queue 232. Again, because the length of the node-specific adjacency list for node Z is 27 node identifiers, which is not perfectly divisible by the width of the vectors being used, five node identifiers (depicted as invalid data 1332), which are not part of the node-specific adjacency list for node Z, are copied to the memory array for current queue 232 after the end of the valid copied data.

Many times, after all adjacency list data is copied to current queue 232, there remains a portion of invalid data (e.g., invalid data 1332) in current queue 232 after the copied valid data. According to an embodiment, instance 214 overwrites the remaining portion of invalid data with nonce data, i.e., data that is distinguishable from valid data. In an embodiment where the node identifiers stored in adjacency list 1300 are non-negative integers, an example of nonce data is '−1' values.

To illustrate, after performing third copy operation 1330, instance 214 performs an operation 1350 to overwrite invalid data 1322, by which instance 214 copies a vector 1352—populated with nonce (e.g., '−1') values in all 16 slots—to a location directly after the valid data in current queue 232 such that the nonce data is contiguous to the valid data in queue 232. Because the valid data in current queue 232 is followed by a full vector of nonce data, any vector-based analysis of the information in current queue 232 will include only valid data, and, potentially, nonce data, which prevents any analysis of invalid data that may be erroneously interpreted as valid data. If the invalid data were not overwritten, then the vectorized search in the queue via contains_end_node would need to handle the comparison of the last vector in the queue differently.

The following Pseudocode 7 depicts an example vectorized fetch_neighbors method of the class Graph:

Pseudocode 7: fetch neighbors( )

```
1  void Graph::fetch_neighbors(SIMDVisitorState& vs) {
2      // get both queues from the visitor state
3      SIMDVisitorQueue *cur_queue = vs.getCurQueue( );
4      SIMDVisitorQueue *next_queue = vs.getNextQueue( );
5      // get the pointer to the memory array of the queue
6      int *cur_data = cur_queue->data( );
7      // iterate over all nodes of the next queue
8      for(auto it = next_queue->begin( ); it != next_queue->end( ); it++) {
9          Node &node = nodes[*it];
10         // obtain pointer needed for copying the node's neighbor nodes
11         int n_vec = node.n_edges / K + ((node.n_edges & (K−1)) != 0);
12         __m512i* in_edges      = (__m512i*) node.edges;
13         __m512i* in_edges_end  = (__m512i*) node.edges + n_vec;
14         __m512i* out_edges     = (__m512i*) cur_data;
15         // copy all of the node's neighbor nodes Into the current queue
16         while(in_edges != in_edges_end) {
17             __m512i vec = _mm512_loadu_si512(in_edges);
18             _mm512_storeu_si512(out_edges, vec);
19             in_edges++;
20             out_edges++;
21         }
22         cur_data += node.n_edges;
23     }
24     // add −1 values at the end of the current queue to enable
```

Pseudocode 7: fetch neighbors( )

```
25     // vectorized search within it
26     _mm512_storeu_si512((__m512i*) cur_data,
            _mm512_set_epi32(−1));
27     cur_queue->resize(cur_data − cur_queue->data( ));
28     // drop all nodes from the next queue
29     next_queue->resize(0);
30 }
```

The example fetch_neighbors method in Pseudocode 7 takes one parameter vs of type SIMDVisitorState, which holds a vectorized hash table and queues. The method first assigns the queues of the visitor state to the local variables cur_queue and next_queue, respectively. The method further assigns a pointer referring to the data or memory array of the current queue to the local variable cur_data.

At lines 7-23 of Pseudocode 7, the method iterates over all nodes that are in the next queue. For each node, the method copies the node's neighbor nodes into the current queue in a vectorized fashion. Specifically, copying the neighbor node identifiers into the memory array for the current queue is done using a loop that copies a vector of values at a time via the vectorized load instruction _mm512_loadu_si512 and the vectorized store instruction _mm512_storeu_si512. Before entering the inner loop (lines 16-21), at line 11, the method calculates how many vectors—containing the neighbor nodes of a given node in the next queue—are to be copied. At lines 12-14, the method further calculates the addresses from where and to where data representing the neighbor nodes needs to be copied. As discussed above, after all nodes of the next queue are processed, there might be invalid data behind the neighbor node data that has been copied into the next queue, i.e., a portion of the values in the last vector of the queue. At lines 24-26, the invalid data is overwritten with '−1' values via _mm512_storeu_si512. Finally, at lines 28-29, the size of the current queue is adjusted to the number of neighbor nodes that have been copied to the current queue, and the size of the next queue is set to 0.

Hybrid/Batch Processing of Current Queue Nodes

According to an embodiment, instead of the current queue storing all neighbor nodes of all nodes in the next queue, as described above, a hybrid search technique processes batches of nodes in the current queue. This embodiment reduces the overall memory footprint of techniques described above. For example, during the first phase of a breadth-first search expansion iteration, instead of loading all neighbor nodes of all nodes from next queue 234 into current queue 232, instance 214 loads, into current queue 232, neighbors of nodes from next queue 234 until a threshold number of neighbor nodes has been reached, e.g., 1000 node identifiers. This partial set of neighbor nodes is referred to herein as a "batch". Instance 214 performs the second and third phases of the vectorized shortest-path search techniques described above on the current batch of nodes in current queue 232.

If the destination node was not found in the previous batch, instance 214 loads another batch of neighbor nodes into current queue 232 until the threshold size has been reached, or until there are no more neighbor nodes, of nodes stored in next queue 234, to load. As with the previous batch, instance 214 performs the second and third phases of the vectorized shortest-path search techniques described above on this additional batch of nodes in current queue 232.

Visitor State

The following Pseudocode 8 depicts an example class SIMDVisitorState, which holds vectorized data structures, such as those needed by the vectorized shortest-path techniques described above.

```
Pseudocode 8: SIMDVisitorState
1     class SIMDVisitorState {
2     private:
3        SIMDHashSet hashset;
4        SIMDVisitorQueue cur_queue;
5        SIMDVisitorQueue next_queue;
6     public :
7        SIMDVisitorState( ) { }
8        ~SIMDVisitorState( ) { }
9
10       // return the hash table holding the visited nodes
11       SIMDHashSet* getHashSet( ) {
12          return &hashset;
13       }
14
15       // returns the current queue
16       SIMDVisitorQueue* getCurQueue( ) {
17          return &cur_queue;
18       }
19       // returns the next queue
20       SIMDVisitorQueue* getNextQueue( ) {
21          return &next_queue ;
22       }
23
24       // resets hash table and the queues to their initial
25       // empty state
26       void clear( ) {
27          hashset.clear( );
28          cur_queue.resize(0);
29          next_queue.resize(0);
30       }
31    };
```

In the context of the shortest_path method described above, an instance of SIMDVisitorState holds the vectorized hash table hashset and the two vectorized queues cur_queue and next_queue. At lines 7-8, a constructor method and a destructor method initialize and destroy the vectorized data structures when the state object is created or destroyed, respectively. At lines 10-13, the method getHashSet returns a pointer to the vectorized hash table. Similarly, at lines 15-22, the methods getCurQueue and getNextQueue respectively return pointers to the associated queues.

At lines 24-30, the clear method resets all data structures to their initial state. As such, resetting an instance of SIMDVisitorState does not require additional memory allocation in any of the data structures nor does it require any overwriting of values; only a few pointers are set to their initial state such that the method has constant computational cost and requires only a few instructions to complete.

Query Planning and Optimization

For simplicity of illustration herein, no additional query optimizations, such as reordering of explored nodes, are described. However, additional query optimization may be implemented as desired in connection with techniques described herein.

Results of Experimentation

Experiments have shown that the techniques described herein for vectorized shortest-path graph search used in connection with the vectorized hash table and vectorized queue structures are superior over scalar shortest-path graph search counterparts (see Pseudocode 9 below).

Several experiments were conducted showing that the vectorized shortest-path graph techniques that use vectorized data structures are superior over the scalar shortest-path graph technique. Experiments were conducted on a system that comprises an Intel i3-8121U CPU with a core frequency of up to 3.20 GHz and 8 GB of main memory. The CPU supports the following AVX-512 instruction sets: AVX512F, AVX512CD, AVX512BW, AVX512DQ, AVX512VL, AVX512IFMA, and AVX512VBMI. Linux (kernel version 4.4.0) was used as the operating system. The techniques were implemented in C++ and were compiled using GCC 5.4.0.

The scalar shortest-path technique depicted in Pseudocode 9 was compared with the vectorized shortest-path technique, described herein, using the vectorized hash table and vectorized queue data structures also described herein. For the vectorized shortest-path technique, K=16, i.e., the 512-bit registers used by the AVX-512 instructions, were utilized. The experiments were conducted on real-world datasets that are freely available on snap.stanford.edu/data/.

Figures 14A, 14B:
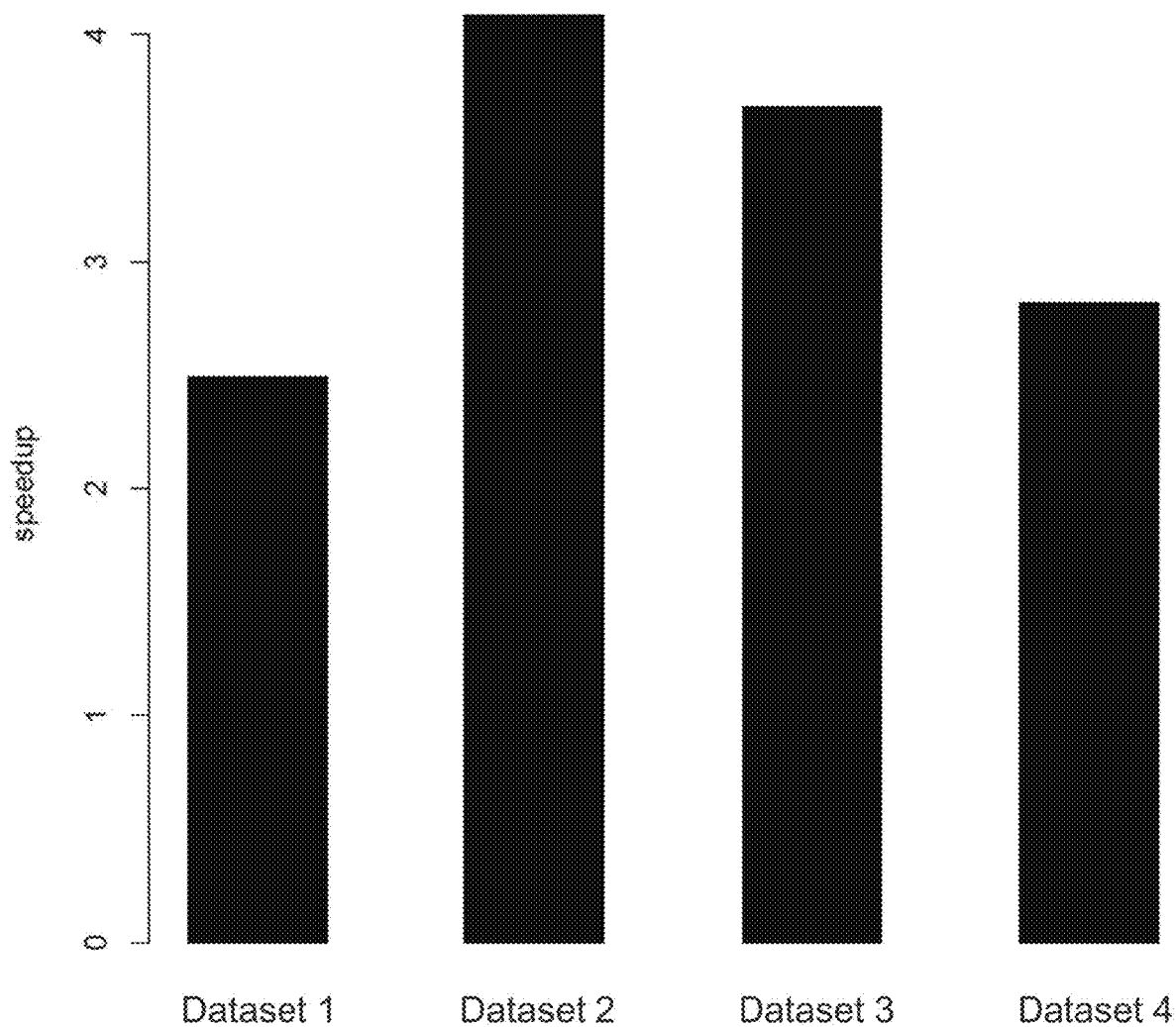
FIGS. 14A-14B depict characteristics of datasets that were used for experimentation, and also speedups achieved by vectorized shortest-path techniques, described herein, for the various datasets.

FIG. 14A depicts characteristics of the datasets that were used for the experiments described herein. Datasets with different vertex-to-edge ratios were selected to illustrate that the vectorized techniques described herein significantly improve performance independent of the dataset characteristics. When loaded in memory, the graphs for the datasets require from 50 MB up to around 0.5 GB of main memory. Dataset 1 produces an undirected graph while all other datasets produce directed graphs. For each dataset, 10,000 pairs consisting of a start vertex and a destination vertex—both randomly chosen from all vertices of the dataset—were generated. The runtime for performing the shortest-path search was measured for all pairs. Each search was run sequentially one after another. Loading the dataset is not included in the measured runtimes.

FIG. 14B depicts the speedups achieved by the vectorized shortest-path search techniques described herein when compared with the scalar shortest-path search technique for the different datasets of FIG. 14A. Accordingly, for each dataset, the vectorized shortest-path search technique is considerably faster than the scalar shortest-path search technique. Specifically, speedups from 2.5× up to 4.1× were achieved. Similar results are expected for other datasets.

General Overview: Database Systems

A DBMS manages a database. A DBMS may comprise one or more database servers. A database comprises database data and a database dictionary that are stored on a persistent memory mechanism, such as a set of hard disks. Database data, including graph data, may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the graph queries is property graph query language (PGQL), which is a graph query language with a syntax close to structured query language (SQL). (Additional information about PGQL can be found in "PGQL: a Property Graph Query Language", by Oskar van Rest et al., GRADES 2016, Jun. 24, 2016, the entire contents of which is incorporated by reference as if fully set forth herein.)

A multi-node DBMS is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Shortest-Path Graph Search

Graph processing is an important tool for data analytics. Specifically, fine-grained relationships between data entities are materialized, in a graph database, as graph edges (or simply "edges") between graph nodes (or simply "nodes"). Information about the entities, represented by nodes, and information about relationships between the entities, represented by edges, may be queried and analyzed to gain insights into the represented data.

Graph processing consists of two main approaches: (a) analytics/algorithms, and (b) pattern-matching queries. A graph algorithm, such as PageRank, iteratively explores graph data to identify information encoded in the graph, and can aggregate the identified information. In contrast, pattern-matching queries provide an interface for interactive exploration of graphs similar to what structured query language (SQL) offers for relational databases, with a focus on exploring connections in the data. For simplicity, the term "graph queries" herein refers to graph querying and pattern matching. While graph analytics have been heavily researched, graph queries have attracted far less attention. Nevertheless, graph queries are a very important tool for industry, as indicated by the large number of available graph query engines and languages.

Graph queries are a challenging workload because they focus on connections within the graph data. Finding the shortest path(s) from one or more source nodes to one or more destination nodes in graph data (referred to herein as shortest-path graph search or shortest-path problem) is a key problem in graph theory. It is a computational and memory expensive problem, and has many applications in a large variety of systems like graph databases, search engines, or social networks. Some use cases include path-finding in road networks, fraud detection, or routing in computer networks. The efficiency of the shortest-path graph search techniques utilized in such applications greatly affects the efficiency of the applications themselves.

There are multiple variations of the shortest-path problem. The shortest path can either constitute 1) the path that has the least edges to get from a source to a destination node—i.e., it has the smallest hop-distance (where a hop is performed between two nodes directly connected by an edge); or 2) the path where the sum of the weight of the path's edges is minimal—i.e., the so called 'cheapest path'. FIG. 1 depicts example graph data 100 with nodes A-F and edges (associated with weights) representing relationships between the nodes. In FIG. 1, the shortest path, with the least number of hops, from node A to node B is A-D-B, and the cheapest path from node A to node B is A-E-D-B.

There are further variations regarding the number of source and destination nodes. The single-pair shortest path problem, involving a single pair of nodes (as in the shortest-path search from node A to node B explained above), involves the shortest path from one source node to one destination node. The single-source shortest path problem involves the shortest paths from one source node to each of a plurality of destination nodes (up to all other nodes) in the graph. The single-destination shortest-path problem involves the shortest paths from each of a plurality of source nodes (up to all nodes) of the graph to one destination node. The all-pairs shortest-path problem involves the shortest paths from each of a plurality of source nodes (up to all nodes) of the graph to each of a plurality of destination nodes (up to all other nodes) of the graph. Shortest-path problems are prevalent through many kinds of graph analysis, and, as such, the effectiveness of an implemented solution to the shortest-path problem greatly affects whether the associated graph analysis is performed efficiently.

Shortest-path graph search algorithms differ significantly based on the physical representation of the graph. Graphs can either be represented via adjacency matrices or via adjacency lists. In adjacency matrix-type graph representations, each element of a matrix represents whether an associated pair of nodes in the represented graph are adjacent (or neighbors), i.e., connected by one hop. A matrix representation works well for dense graphs that do not change over time. However, matrix-type graph representations are generally used to represent relatively small graph datasets because the memory consumption of an adjacency matrix is quadratic based on the number of nodes in the represented graph. Thus, matrix-style graph representation is generally impractical for even mid-sized graph datasets, let alone for large graph datasets, given that the memory requirement of an adjacency matrix for a medium to large dataset generally exceeds available memory.

In adjacency list-type graph representations, one or more adjacency lists that represent a given graph include, for each node in the represented graph, a respective sub-list of neighbor nodes of the respective node. Memory requirements for adjacency list-type graph representations are linear based on the number of nodes in the represented graph. As such, for large graph datasets, list-type graph representations use less memory than would be required for matrix-type graph representations.

Generally, breath-first traversal strategies are used to solve shortest-path problems. This technique iteratively expands the known set of nodes that can be reached from a source node until either (a) a destination node is reached, or (b) the set of nodes reachable by the source node cannot be expanded any further. In the latter case, there is no path from the source node to the destination node in the graph data.

Implementations of such strategies generally maintain a hash table to record which nodes have already been visited. Such implementations also generally maintain two queues; one queue records a set of nodes that are expanded in a current iteration, and another queue records a set of nodes that will be expanded in a next iteration.

The following Pseudocode 9 illustrates a scalar implementation of shortest-path graph search:

```
Pseudocode 9: scalar shortest_path( )

1    int Graph: :shortest_path (ScalarVisitorState& vs, int node0, int
2                node1) {
3       // check if both nodes are the same node
4       if(node0 == node1)
5          return 0;
6       queue <int>* cur_queue = vs.getCurQueue( );
7       queue <int>* next_queue = vs.getNextQueue( );
8       unordered_set <int>* visited = vs.getVisitedSet( );
9       int dist = 0;
10      // fill the next queue with the start node
11      next_queue -> push(node0);
12      // run until there is no node in the next queue
13      while(!next_queue-> empty( )) {
14         // assign the next queue's nodes to the current queue
15         cur_queue -> swap(*next_queue);
16         // increase the distance by one
17         dist ++;
18         // process all nodes that are in the current queue
19         while(!cur_queue->empty( )) {
20            Node &node = nodes [cur_queue->front( )];
21            // remove the node from the current queue
22            cur_queue->pop( );
23            // iterate over all neighbor nodes of the node
24            for(int i = 0; i < node.n_edges; i++) {
25               int next = node.edges[i];
26               // return if the end node has been found
27               if (next == node1) {
28                  return dist;
29               }
30               // add the neighbor node only if it has not been
31               // visited so far
32               auto it = visited->find(next);
33               if(it == visited->end( )) {
34                  // the neighbor node has not been visited
35                  next_gueue->push(next);
36                  // add the node to the set of visited nodes
37                  visited->insert(next);
38               }
39            }
40         }
41      }
42      // there is no path from the start node to the end node
43      return -1;
44   }
```

In lines 1-2 of Pseudocode 9, the function Graph::shortest_path takes the source node (node0) and destination node (nodes), as well as a state object (vs), as input parameters. The state object holds the data structures required by the function (i.e., the queues, and the unordered set, which is generally implemented as a hash table) and is used to avoid creating and destroying these data structures with each invocation of the function. At lines 4-5, the function returns a distance of 0 if a given node is passed as both source and destination node. At lines 6-8, the unordered set and two queues are assigned to the variables visited, cur_queue, and next_queue. All of these three data structures are empty at the beginning of the function. At line 9, the variable dist—holding the distance—is initially set to 0 and the start node is added to next_queue.

Thereafter, at lines 13-40, Pseudocode 9 iterates in the outer loop until either the destination node is found (lines 27-29), or the next_queue is empty (lines 13). In the latter case, there is no path from the source node to the end node and −1 is returned (line 43). In each iteration of the outer loop, the distance is increased by one (line 17) and the contents of the cur_queue and next_queue are swapped, i.e., by assigning all nodes of the next_queue to the cur_queue and, thereby, emptying the next_queue (line 15). Thereafter, a node of the cur_queue is fetched (line 20), and Pseudocode 9 iterates over all of the neighbor nodes of the fetched node in the inner loop (lines 19-39). At line 22, the fetched node is removed from the cur_queue. In the inner loop, Pseudocode 9 checks if each neighbor node is the destination node—in which case dist is returned and the function is terminated (lines 27-29)—and, if not, probes whether the node is already in the visited hash table (line 32). If the node has not been visited before, Pseudocode 9 adds the neighbor node to the next_queue and visited hash table (lines 33-38).

Such scalar shortest-path graph searches require swapping contents of queues, and also checking whether each node is the destination node and whether the node has been visited before. These function require touching each node in the queue multiple times, which can be time consuming.

Vectorization has been used in some limited ways to reduce the need to touch every node for every needed operation of a shortest-path graph search. However, vectorized shortest-path graph algorithms are generally configured to work for adjacency matrices (i.e., they rely on a distance matrix as input). As indicated above, adjacency matrix-based representations of graph data do not scale well, and, as such, are not well-suited for large graph datasets. It would be beneficial to vectorize shortest-path graph data search for adjacency list-type graph representations to better facilitate efficient shortest-path graph searches for large datasets.

Database System Configuration

A database client, not depicted in FIG. 2, connects to database system 200. The client may comprise a database application running on a client node. The client interacts with an instance of database system 200, such as instance 214, by submitting commands that cause the instance to perform operations on data stored in the database. For example, a command may be a request to access or modify data from the database, perform operations on the data, and/or return the data to the client.

Typically, database system 200 may be implemented by a single machine, e.g., device 210, or may be implemented by multiple machines that are communicatively connected. Referring to FIG. 2, database server instance 214, running on device 210, maintains database data 222 in persistent storage 220.

According to an embodiment, device 210 may be referred to as a machine nodes, and runs database server instance 214. A database server instance (or "instance") is a server that comprises a combination of the software and allocation of resources from a machine node. Specifically, a server, such as a database server, or any other process is a combination of integrated software components and an allocation of computational resources, such as memory, a machine node (i.e., a computing device and/or memory accessible to the computing device), and/or sub-processes on the machine node for executing the integrated software components on a processor, the combination of the software and computational resources being dedicated to performing a particular function on behalf of one or more clients. In the embodiment depicted in FIG. 2, instance 214 implements server-side functions of database system 200.

Database data 222 may reside in volatile and/or non-volatile storage, such as volatile memory 212, persistent storage 220, etc. Each machine node implementing database system 200 may include a virtual disk and/or a set of physical disks. Additionally or alternatively, database data 222 may be stored, at least in part, in main memory of a database server computing device.

One or more of the functions attributed to any process described herein, may be performed any other logical entity that may or may not be depicted in FIG. 2, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 15:
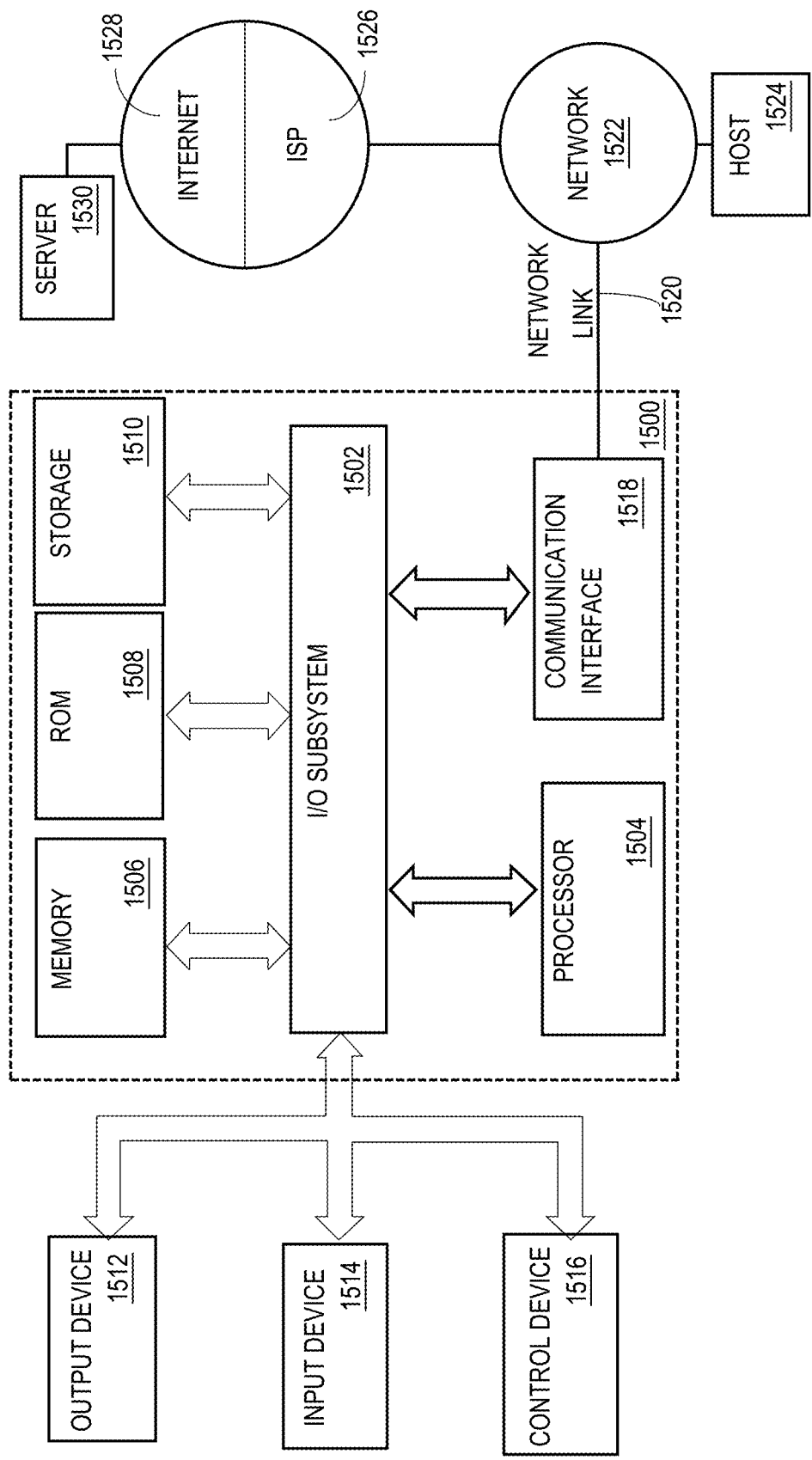
FIG. 15 depicts a block diagram of a computer system, on which embodiments may be implemented.

For example, FIG. 15 is a block diagram that illustrates a computer system 1500 upon which an embodiment of the invention may be implemented. Computer system 1500 includes a bus 1502 or other communication mechanism for communicating information, and a hardware processor 1504 coupled with bus 1502 for processing information. Hardware processor 1504 may be, for example, a general purpose microprocessor.

Computer system 1500 also includes a main memory 1506, such as a random access memory (RAM) or other dynamic storage device, coupled to bus 1502 for storing information and instructions to be executed by processor 1504. Main memory 1506 also may be used for storing temporary variables or other intermediate information during execution of instructions to be executed by processor 1504. Such instructions, when stored in non-transitory storage media accessible to processor 1504, render computer system 1500 into a special-purpose machine that is customized to perform the operations specified in the instructions.

Computer system 1500 further includes a read only memory (ROM) 1508 or other static storage device coupled to bus 1502 for storing static information and instructions for processor 1504. A storage device 1510, such as a magnetic disk, optical disk, or solid-state drive is provided and coupled to bus 1502 for storing information and instructions.

Computer system 1500 may be coupled via bus 1502 to a display 1512, such as a cathode ray tube (CRT), for displaying information to a computer user. An input device 1514, including alphanumeric and other keys, is coupled to bus 1502 for communicating information and command selections to processor 1504. Another type of user input device is cursor control 1516, such as a mouse, a trackball, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

Computer system 1500 may implement the techniques described herein using customized hard-wired logic, one or more ASICs or FPGAs, firmware and/or program logic which in combination with the computer system causes or programs computer system 1500 to be a special-purpose machine. According to one embodiment, the techniques herein are performed by computer system 1500 in response to processor 1504 executing one or more sequences of one or more instructions contained in main memory 1506. Such instructions may be read into main memory 1506 from another storage medium, such as storage device 1510. Execution of the sequences of instructions contained in main memory 1506 causes processor 1504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1510. Volatile media includes dynamic memory, such as main memory 1506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1502. Transmission media can also take the form of acoustic or light waves, such as those generated during radio-wave and infra-red data communications.

Various forms of media may be involved in carrying one or more sequences of one or more instructions to processor 1504 for execution. For example, the instructions may initially be carried on a magnetic disk or solid-state drive of a remote computer. The remote computer can load the instructions into its dynamic memory and send the instructions over a telephone line using a modem. A modem local to computer system 1500 can receive the data on the telephone line and use an infra-red transmitter to convert the data to an infra-red signal. An infra-red detector can receive the data carried in the infra-red signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network (ISDN) card, cable modem, satellite modem, or a modem to provide a data communication connection to a corresponding type of telephone line. As another example, communication interface 1518 may be a local area network (LAN) card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider (ISP) 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are example forms of transmission media.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518.

The received code may be executed by processor 1504 as it is received, and/or stored in storage device 1510, or other non-volatile storage for later execution.

Software Overview

Figure 16:
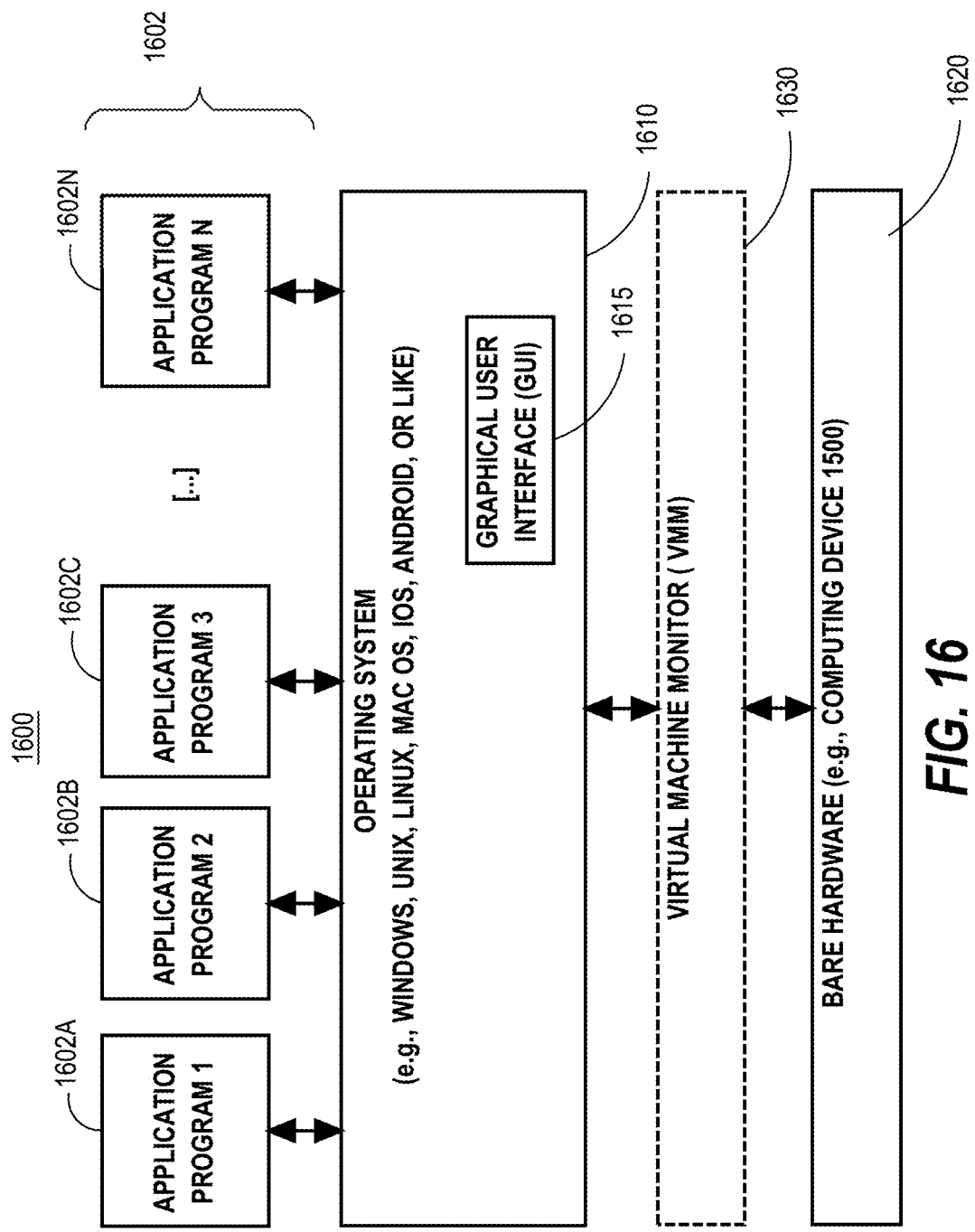
FIG. 16 depicts a software system, with which embodiments may be implemented.

FIG. 16 is a block diagram of a basic software system 1600 that may be employed for controlling the operation of computer system 1500. Software system 1600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1600 is provided for directing the operation of computer system 1500. Software system 1600, which may be stored in system memory (RAM) 1506 and on fixed storage (e.g., hard disk or flash memory) 1510, includes a kernel or operating system (OS) 1610.

The OS 1610 manages low-level aspects of computer operation, including managing execution of processes, memory allocation, file input and output (I/O), and device I/O. One or more application programs, represented as 1602A, 1602B, 1602C . . . 1602N, may be "loaded" (e.g., transferred from fixed storage 1510 into memory 1506) for execution by the system 1600. The applications or other software intended for use on computer system 1500 may also be stored as a set of downloadable computer-executable instructions, for example, for downloading and installation from an Internet location (e.g., a Web server, an app store, or other online service).

Software system 1600 includes a graphical user interface (GUI) 1615, for receiving user commands and data in a graphical (e.g., "point-and-click" or "touch gesture") fashion. These inputs, in turn, may be acted upon by the system 1600 in accordance with instructions from operating system 1610 and/or application(s) 1602. The GUI 1615 also serves to display the results of operation from the OS 1610 and application(s) 1602, whereupon the user may supply additional inputs or terminate the session (e.g., log off).

OS 1610 can execute directly on the bare hardware 1620 (e.g., processor(s) 1504) of computer system 1500. Alternatively, a hypervisor or virtual machine monitor (VMM) 1630 may be interposed between the bare hardware 1620 and the OS 1610. In this configuration, VMM 1630 acts as a software "cushion" or virtualization layer between the OS 1610 and the bare hardware 1620 of the computer system 1500.

VMM 1630 instantiates and runs one or more virtual machine instances ("guest machines"). Each guest machine comprises a "guest" operating system, such as OS 1610, and one or more applications, such as application(s) 1602, designed to execute on the guest operating system. The VMM 1630 presents the guest operating systems with a virtual operating platform and manages the execution of the guest operating systems.

In some instances, the VMM 1630 may allow a guest operating system to run as if it is running on the bare hardware 1620 of computer system 1500 directly. In these instances, the same version of the guest operating system configured to execute on the bare hardware 1620 directly may also execute on VMM 1630 without modification or reconfiguration. In other words, VMM 1630 may provide full hardware and CPU virtualization to a guest operating system in some instances.

In other instances, a guest operating system may be specially designed or configured to execute on VMM 1630 for efficiency. In these instances, the guest operating system is "aware" that it executes on a virtual machine monitor. In other words, VMM 1630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   increasing a cardinality of buckets of a particular hash table, which comprises a set of buckets, to produce an expanded hash table by, for each bucket of the set of buckets:
   executing a first SIMD instruction instance to produce a split mask, for said each bucket, based on a hash function for the expanded hash table,
   executing a second SIMD instruction instance, based at least in part on the split mask, to identify a first set of values of a plurality of values in said each bucket,
   populating a first derived bucket, of the expanded hash table, with the first set of values,
   populating a second derived bucket, of the expanded hash table, with a second set of values, of the plurality of values, other than the first set of values;
   wherein the method is performed by one or more computing devices.

2. The computer-executed method of claim 1, wherein:
   executing the second SIMD instruction instance produces a first vector of values comprising the first set of values; a representation of the first vector of values comprises a first plurality of ordered value slots;
   the first vector of values includes the first set of values in contiguous value slots at a first extreme of the first plurality of ordered value slots.

3. The computer-executed method of claim 2, wherein each of one or more vacant slots, of the first plurality of ordered value slots and second plurality of ordered value slots, stores a vacant-slot-indicator value.

4. The computer-executed method of claim 1, further comprising:
   determining a hash-target bit position based, at least in part, on a size of the expanded hash table;
   wherein the hash function for the expanded hash table is based, at least in part, on the hash-target bit position;
   wherein, for each bucket of the set of buckets:
      said executing the first SIMD instruction instance to produce a split mask for each bucket of the set of buckets is based on bits, of the plurality of values in said each bucket, at the hash-target bit position,
      each value, of the first set of values for said each bucket, has a set bit at the hash-target bit position, and
      each value, of the second set of values for said each bucket, has an unset bit at the hash-target bit position.

5. The computer-executed method of claim 1, wherein:
   the expanded hash table comprises a particular first derived bucket and a particular second derived bucket, both derived from a particular bucket of the set of buckets of the particular hash table;
   a first bucket number of the particular first derived bucket in the expanded hash table is a bucket number of the particular bucket in the particular hash table; and
   a second bucket number of the second derived bucket in the expanded hash table is the bucket number of the particular bucket in the particular hash table offset by a size of the particular hash table.

6. The computer-executed method of claim 1, further comprising:
   adding a particular value to the particular hash table by:
      identifying a target bucket, of the set of buckets, that corresponds to the particular value;
      determining whether the target bucket has any vacant slots;
      in response to determining that the target bucket has no vacant slots, performing said increasing the cardinality of buckets of the particular hash table to produce the expanded hash table;
      wherein the expanded hash table comprises a second set of buckets;
      after the expanded hash table is produced:
         identifying a second target bucket, of the second set of buckets, that corresponds to the particular value,
         determining whether the second target bucket has any vacant slots, and
         in response to determining that the second target bucket has at least one vacant slot, adding the particular value to the second target bucket.

7. The computer-executed method of claim 6, wherein:
   the target bucket comprises a plurality of slots; and
   determining whether the target bucket has any vacant slots comprises:

populating a vector with a vacant-slot-indicator value,
using a single SIMD instruction to compare values stored in the plurality of slots of the target bucket with values of the vector to produce a result vector,
determining, based on the result vector, that no slots of the target bucket contain the vacant-slot-indicator value, and
wherein determining that the target bucket has no vacant slots is based on determining that no slots of the target bucket contain the vacant-slot-indicator value.

8. The computer-executed method of claim 6, wherein:
the second target bucket comprises a plurality of slots; and
determining whether the second target bucket has any vacant slots comprises:
populating a vector with a vacant-slot-indicator value;
using a single SIMD instruction to compare values stored in the plurality of slots of the second target bucket with values of the vector to produce a result vector;
determining, based on the result vector, that one or more slots of the second target bucket contain the vacant-slot-indicator value; and
wherein determining that the second target bucket has at least one vacant slot is based on determining that the one or more slots of the second target bucket contain the vacant-slot-indicator value.

9. The computer-executed method of claim 6, wherein:
occupied slots of the second target bucket are stored contiguously at a first extreme of the second target bucket; and
adding the particular value to the second target bucket comprises performing a single SIMD instruction to:
based, at least on a permutation mask, shift, by one slot, values in the second target bucket toward a second extreme of the second target bucket to produce a vacant slot at the first extreme of the second target bucket, and
based, at least in part, on a value vector populated with the particular value, insert the particular value into the vacant slot at the first extreme of the second target bucket.

10. The computer-executed method of claim 6, wherein identifying the second target bucket, of the second set of buckets, that corresponds to the particular value is based, at least in part, on a modulo hash function that divides the particular value by a value that is based, at least in part, on a size of the expanded hash table.

11. The computer-executed method of claim 1, further comprising:
executing a third SIMD instruction instance, based at least in part on the split mask, to identify the second set of values of the plurality of values.

12. The computer-executed method of Claim 11, wherein:
the first SIMD instruction instance comprises a first SIMD instruction;
the second SIMD instruction instance and the third SIMD instruction instance respectively comprise a second SIMD instruction; and
an AVX-512 instruction set comprises the first SIMD instruction and the second SIMD instruction.

13. The computer-executed method of claim 11, wherein:
executing the third SIMD instruction instance produces a second vector of values comprising the second set of values;
a representation of the second vector of values comprises a second plurality of ordered value slots; and the second vector of values includes the second set of values in contiguous value slots at a first extreme of the second plurality of ordered value slots.

14. A computer-executed method comprising:
inserting a particular value into a vector that comprises a plurality of values;
wherein the plurality of values is stored contiguously at a first extreme of the vector;
wherein inserting the particular value comprises:
determining whether there are one or more empty slots in the vector, and
in response to determining that there are one or more empty slots in the vector, performing a single SIMD instruction to perform:
based, at least on a permutation mask, shifting the plurality of values in the vector toward a second extreme of the vector, and
inserting the particular value at the first extreme of the vector;
wherein the method is performed by one or more computing devices.

15. The computer-executed method of claim 14, wherein the vector is a first vector, the method further comprising, prior to inserting the particular value into the vector:
identifying a set of values, from a second vector, with which to populate the first vector;
executing a single second SIMD instruction to perform compressing the set of values into contiguous slots at the first extreme of the first vector.

16. The computer-executed method of claim 14, wherein said inserting the particular value at the first extreme of the vector is based, at least in part, on a value vector populated with the particular value.

17. One or more non-transitory computer-readable media storing one or more sequences of instructions that, when executed by one or more processors, cause:
increasing a cardinality of buckets of a particular hash table, which comprises a set of buckets, to produce an expanded hash table by, for each bucket of the set of buckets:
executing a first SIMD instruction instance to produce a split mask, for said each bucket, based on a hash function for the expanded hash table,
executing a second SIMD instruction instance, based at least in part on the split mask, to identify a first set of values of a plurality of values in said each bucket,
populating a first derived bucket, of the expanded hash table, with the first set of values,
populating a second derived bucket, of the expanded hash table, with a second set of values, of the plurality of values, other than the first set of values.

18. The one or more non-transitory computer-readable media of claim 17, wherein:
executing the second SIMD instruction instance produces a first vector of values comprising the first set of values;
a representation of the first vector of values comprises a first plurality of ordered value slots;
the first vector of values includes the first set of values in contiguous value slots at a first extreme of the first plurality of ordered value slots.

19. The one or more non-transitory computer-readable media of claim 18, wherein each of one or more vacant slots, of the first plurality of ordered value slots and second plurality of ordered value slots, stores a vacant-slot-indicator value.

20. The one or more non-transitory computer-readable media of claim 17, wherein the one or more sequences of instructions further comprise instructions that, when executed by one or more processors, cause:
  determining a hash-target bit position based, at least in part, on a size of the expanded hash table;
  wherein the hash function for the expanded hash table is based, at least in part, on the hash-target bit position;
  wherein, for each bucket of the set of buckets:
    said executing the first SIMD instruction instance to produce a split mask for each bucket of the set of buckets is based on bits, of the plurality of values in said each bucket, at the hash-target bit position,
    each value, of the first set of values for said each bucket, has a set bit at the hash-target bit position, and
    each value, of the second set of values for said each bucket, has an unset bit at the hash-target bit position.

21. The one or more non-transitory computer-readable media of claim 17, further comprising:
  executing a third SIMD instruction instance, based at least in part on the split mask, to identify the second set of values of the plurality of values;
  wherein the first SIMD instruction instance comprises a first SIMD instruction;
  wherein the second SIMD instruction instance and the third SIMD instruction instance respectively comprise a second SIMD instruction; and
  wherein an AVX-512 instruction set comprises the first SIMD instruction and the second SIMD instruction.

22. The one or more non-transitory computer-readable media of claim 17, wherein:
  the expanded hash table comprises a particular first derived bucket and a particular second derived bucket, both derived from a particular bucket of the set of buckets of the particular hash table;
  a first bucket number of the particular first derived bucket in the expanded hash table is a bucket number of the particular bucket in the particular hash table; and
  a second bucket number of the second derived bucket in the expanded hash table is the bucket number of the particular bucket in the particular hash table offset by a size of the particular hash table.

23. The one or more non-transitory computer-readable media of claim 17, wherein the one or more sequences of instructions further comprise instructions that, when executed by one or more processors, cause:
  adding a particular value to the particular hash table by:
    identifying a target bucket, of the set of buckets, that corresponds to the particular value;
    determining whether the target bucket has any vacant slots;
    in response to determining that the target bucket has no vacant slots, performing said increasing the cardinality of buckets of the particular hash table to produce the expanded hash table;
    wherein the expanded hash table comprises a second set of buckets;
    after the expanded hash table is produced:
      identifying a second target bucket, of the second set of buckets, that corresponds to the particular value,
      determining whether the second target bucket has any vacant slots, and
      in response to determining that the second target bucket has at least one vacant slot, adding the particular value to the second target bucket.

24. The one or more non-transitory computer-readable media of claim 23, wherein:
  the target bucket comprises a plurality of slots; and
  determining whether the target bucket has any vacant slots comprises:
    populating a vector with a vacant-slot-indicator value,
    using a single SIMD instruction to compare values stored in the plurality of slots of the target bucket with values of the vector to produce a result vector,
    determining, based on the result vector, that no slots of the target bucket contain the vacant-slot-indicator value, and
    wherein determining that the target bucket has no vacant slots is based on determining that no slots of the target bucket contain the vacant-slot-indicator value.

25. The one or more non-transitory computer-readable media of claim 23, wherein:
  the second target bucket comprises a plurality of slots; and
  determining whether the second target bucket has any vacant slots comprises:
    populating a vector with a vacant-slot-indicator value;
    using a single SIMD instruction to compare values stored in the plurality of slots of the second target bucket with values of the vector to produce a result vector;
    determining, based on the result vector, that one or more slots of the second target bucket contain the vacant-slot-indicator value; and
    wherein determining that the second target bucket has at least one vacant slot is based on determining that the one or more slots of the second target bucket contain the vacant-slot-indicator value.

26. The one or more non-transitory computer-readable media of claim 23, wherein:
  occupied slots of the second target bucket are stored contiguously at a first extreme of the second target bucket; and
  adding the particular value to the second target bucket comprises performing a single SIMD instruction to:
    based, at least on a permutation mask, shift, by one slot, values in the second target bucket toward a second extreme of the second target bucket to produce a vacant slot at the first extreme of the second target bucket, and
    based, at least in part, on a value vector populated with the particular value, insert the particular value into the vacant slot at the first extreme of the second target bucket.

27. One or more non-transitory computer-readable media storing one or more sequences of instructions that, when executed by one or more processors, cause:
  inserting a particular value into a vector that comprises a plurality of values;
  wherein the plurality of values is stored contiguously at a first extreme of the vector;
  wherein inserting the particular value comprises:
    determining whether there are one or more empty slots in the vector, and
    in response to determining that there are one or more empty slots in the vector, performing a single SIMD instruction to perform:
      based, at least on a permutation mask, shifting the plurality of values in the vector toward a second extreme of the vector, and
      inserting the particular value at the first extreme of the vector.

28. The one or more non-transitory computer-readable media of claim 27, wherein:
the vector is a first vector; and
the one or more sequences of instructions further comprise instructions that, when executed by one or more processors, cause, prior to inserting the particular value into the vector:
identifying a set of values, from a second vector, with which to populate the first vector, and
executing a single second SIMD instruction to perform compressing the set of values into contiguous slots at the first extreme of the first vector.

* * * * *

UNITED STATES PATENT AND TRADEMARK OFFICE
CERTIFICATE OF CORRECTION

| | |
|---|---|
| PATENT NO. | : 11,222,070 B2 |
| APPLICATION NO. | : 16/803819 |
| DATED | : January 11, 2022 |
| INVENTOR(S) | : Schlegel et al. |

It is certified that error appears in the above-identified patent and that said Letters Patent is hereby corrected as shown below:

On the Title Page

On page 2, Column 1, under Other Publications, Line 8, delete "Vectotization" and insert -- Vectorization --, therefor.

On page 2, Column 2, under Other Publications, Line 15, delete "Data-lntensive" and insert -- Data-Intensive --, therefor.

On page 2, Column 2, under Other Publications, Line 17, delete "Parallels," and insert -- Parallel & --, therefor.

On page 2, Column 2, under Other Publications, Line 17, delete "PROCESSING20" and insert -- Processing 20 --, therefor.

On page 2, Column 2, under Other Publications, Line 20, delete "Inti" and insert -- Intl --, therefor.

On page 2, Column 2, under Other Publications, Line 25, delete "fr" and insert -- für --, therefor.

On page 2, Column 2, under Other Publications, Line 38, delete "Sung-Chui," and insert -- Sung-Chul, --, therefor.

In the Specification

In Column 5, Line 23, delete "0" and insert -- ( ) --, therefor.

In Column 6, Line 49, delete "val vec = mm512 set1 epi32" and insert -- val_vec = _mm512_set1_epi32 --, therefor.

In Column 6, Line 63, after "epi32" insert -- (val_vec, --.

Signed and Sealed this
Twenty-eighth Day of June, 2022

*Katherine Kelly Vidal*

Katherine Kelly Vidal
*Director of the United States Patent and Trademark Office*

CERTIFICATE OF CORRECTION (continued)
U.S. Pat. No. 11,222,070 B2

In Column 6, Line 64, before "_mm512" delete "(val_vec,".

In Column 8, Line 57, delete "epi_32" and insert -- epi32 --, therefor.

In Column 11, Line 28, delete "mm512 _set1" and insert -- _mm512_set1 --, therefor.

In Column 11, Line 36, delete "_mm512_ test" and insert -- _mm512_test --, therefor.

In Column 11, Line 56, delete "node id" and insert -- $node_{id}$ --, therefor.

In Column 14, Line 65, delete "end_ node)" and insert -- end_node) --, therefor.

In Column 14, Line 66, delete "(end node);" and insert -- (end_node); --, therefor.

In Column 17, Line 10, delete "shortest path" and insert -- shortest_path --, therefor.

In Column 17, Lines 29-30, delete "i t++)" and insert -- it++) --, therefor.

In Column 17, Line 40, delete "shortest path" and insert -- shortest_path --, therefor.

In Column 17, Line 53, delete "next queue," and insert -- next_queue, --, therefor.

In Column 21, Line 45, delete "fetch neighbors" and insert -- fetch_neighbors --, therefor.

In Column 21, Line 59, delete "Into" and insert -- into --, therefor.

In Column 22, Line 3, delete "fetch neighbors" and insert -- fetch_neighbors --, therefor.

In Column 22, Line 7, delete "set" and insert -- set1 --, therefor.

In Column 27, Line 40, delete "gueue" and insert -- queue --, therefor.

In Column 27, Line 51, delete "(nodes)," and insert -- (node1), --, therefor.

In Column 27, Line 64, delete "next_queue." and insert -- next queue. --, therefor.

In Column 27, Line 67, delete "next_queue" and insert -- next queue --, therefor.

In Column 33, Line 30, delete "DbaaS" and insert -- DBaaS --, therefor.

In the Claims

In Column 35, Line 54, in Claim 12, delete "Claim" and insert -- claim --, therefor.